United States Patent
Lyubashevsky et al.

(10) Patent No.: US 10,742,413 B2
(45) Date of Patent: Aug. 11, 2020

(54) FLEXIBLE VERIFIABLE ENCRYPTION FROM LATTICES

(71) Applicant: International Business Machines Corporation, Armonk, NY (US)

(72) Inventors: Vadim Lyubashevsky, Zug (CH); Gregory Neven, Oberrieden (CH)

(73) Assignee: International Business Machines Corporation, Armonk, NY (US)

( * ) Notice: Subject to any disclaimer, the term of this patent is extended or adjusted under 35 U.S.C. 154(b) by 337 days.

(21) Appl. No.: 15/496,835

(22) Filed: Apr. 25, 2017

(65) Prior Publication Data

US 2018/0309574 A1   Oct. 25, 2018

(51) Int. Cl.
*H04L 9/30* (2006.01)
*H04L 9/32* (2006.01)

(52) U.S. Cl.
CPC .......... *H04L 9/3093* (2013.01); *H04L 9/3218* (2013.01)

(58) Field of Classification Search
CPC ....... H04L 9/30; H04L 9/3093; H04L 9/3218; H04L 9/3231; H04L 9/0852; H04L 2209/12; H04L 2209/24
USPC .............................................. 378/30; 380/30
See application file for complete search history.

(56) References Cited

U.S. PATENT DOCUMENTS

| | | | | |
|---|---|---|---|---|
| 6,151,394 | A * | 11/2000 | Tatebayashi | H04L 9/0833 380/283 |
| 6,275,936 | B1 * | 8/2001 | Kyojima | G06F 21/62 713/161 |
| 6,282,295 | B1 | 8/2001 | Young et al. | |
| 6,359,986 | B1 * | 3/2002 | Tatebayashi | H04L 9/083 380/277 |
| 7,242,766 | B1 * | 7/2007 | Lyle | H04L 9/12 380/2 |
| 8,630,422 | B2 | 1/2014 | Gentry | |
| 9,281,941 | B2 * | 3/2016 | Gentry | H04L 9/008 |
| 9,608,813 | B1 * | 3/2017 | Roth | H04L 9/0894 |

(Continued)

FOREIGN PATENT DOCUMENTS

| | | | |
|---|---|---|---|
| CN | 103107890 | A | 5/2013 |
| CN | 105162589 | A | 12/2015 |

OTHER PUBLICATIONS

L'opez-Alt, Cryptographic Algorithms for the Secure Delegation of Multiparty Computation, Doctor of Philosophy dissertation, New York University, source: scholar.google.com (Year: 2014).*

(Continued)

*Primary Examiner* — Noura Zoubair
*Assistant Examiner* — Mahabub S Ahmed
(74) *Attorney, Agent, or Firm* — Daniel P. Morris, Esq.; Hoffmann & Baron, LLP

(57) ABSTRACT

Embodiments of the present invention may provide the capability for performing public-key encryption with proofs of plaintext knowledge using a lattice-based scheme that provides improved efficiency over conventional techniques. For example, in an embodiment, a computer-implemented method of verifying encryption may comprise generating a ciphertext, derived from a plaintext, via an encryption scheme, proving validity of the ciphertext, wherein the proof includes at least one challenge value, and using a decryption procedure that recovers a plaintext by choosing at least one additional challenge value at random from a challenge space.

3 Claims, 6 Drawing Sheets

(56) References Cited

U.S. PATENT DOCUMENTS

| | | | | |
|---|---|---|---|---|
| 9,698,986 | B1* | 7/2017 | Gutoski | H04L 9/3093 |
| 9,942,039 | B1* | 4/2018 | Gutoski | H04L 9/3093 |
| 10,103,886 | B1* | 10/2018 | Gutoski | H04L 9/3093 |
| 10,581,812 | B2* | 3/2020 | Rohloff | H04L 9/30 |
| 2006/0171534 | A1* | 8/2006 | Baughman | H04L 9/0618 380/47 |
| 2008/0144813 | A1* | 6/2008 | Furukawa | H04L 9/3066 380/30 |
| 2009/0159666 | A1* | 6/2009 | O'Brien | G06F 21/43 235/380 |
| 2010/0275028 | A1* | 10/2010 | Takashima | H04L 9/3073 713/176 |
| 2011/0060903 | A1* | 3/2011 | Yoshida | H04L 9/302 713/155 |
| 2012/0155635 | A1* | 6/2012 | Vaikuntanathan | H04L 9/0825 380/44 |
| 2013/0010957 | A1* | 1/2013 | Yu | H04L 9/0866 380/260 |
| 2014/0177828 | A1* | 6/2014 | Loftus | H04L 9/008 380/44 |
| 2014/0229744 | A1* | 8/2014 | Doumen | G06F 21/72 713/190 |
| 2014/0321642 | A1* | 10/2014 | El Aimani | H04L 9/3218 380/44 |
| 2014/0334622 | A1* | 11/2014 | Smyth | H04L 9/008 380/28 |
| 2015/0381350 | A1* | 12/2015 | Joye | H04L 9/06 380/30 |
| 2016/0072623 | A1* | 3/2016 | Joye | H04L 9/3073 380/28 |
| 2018/0019976 | A1* | 1/2018 | Ben-Shalom | H04L 9/14 |
| 2018/0198632 | A1* | 7/2018 | Gajek | H04L 9/00 |
| 2018/0337899 | A1* | 11/2018 | Becker | H04L 63/0457 |

OTHER PUBLICATIONS

Brakerski et al., Fully Homomorphic Encryption from Ring-LWE and Security for Key Dependent Messages, International Association for Cryptologic Research (Year: 2011).*

L'opez-Alt, Cryptographic Algorithms for the Secure Delegation of Multiparty Computation, Doctor of Philosophy dissertation, New York University, source: scholar.google.com (Year: 2004).*

Hanrot et al., Algorithms for the Shortest and Closest Lattice Vector Problems, Laboratoire LIP, Lyon France (Year: 2011).*

Benhamouda et al., Better Zero-Knowledge Proofs for Lattice Encryption and Their Application to Group Signatures, International Association for Cryptologic Research (Year: 2014).*

Craig Gentry, Fully Homomorphic Encryption Using Ideal Lattices, Stanford University and IBM Watson (Year: 2009).*

Agrawal et al., Lattice Basis Delegation in Fixed Dimension and Shorter-Ciphertext Hierarchical IBE, International Association for Cryptologic Research (Year: 2010).*

Goldwasser, Proof of Plaintext Knowledge for the Ajtai-Dwork Cryptosystem, Springer (Year: 2005).*

F. Benhamouda, et al., "Better Zero-Knowledge Proofs for Lattice Encryption and Their Application to Group Signatures," Advances in Cryptology—Asiacrypt 2014, vol. 8873 of the series Lecture Notes in Computer Science, pp. 551-572.

Rong Hu, et al., "Proof of Plaintext Knowledge for Code-Based Public-Key Encryption Revisited," Asia CCS '13, May 2013, pp. 1-9.

Ruan De-Clercq, et al., "Efficient Software Implementation of Ring-LWE Encryption," Date '15: Proceedings of the 2015 Design, Automation & Test in Europe Conference & Exhibition, Mar. 2015, pp. 339-344.

Noah Stephens-Davidowitz, "Ring-LWE," https://people.csail.mit.edu/vinodv/6876-Fall2018/RingLWEclass.pdf, 2017, pp. 1-13.

* cited by examiner

Figure 2

Algorithm 2 "Fiat-Shamir with Aborts" Verification Algorithm

Input: A matrix $\mathbf{A} \in R^{\ell \times k}$, a vector $\mathbf{t} \in R^{\ell}$, a vector $\mathbf{q} \in \mathbb{Z}^{\ell}$, $\sigma \in \mathbb{R}^{+}$. A tuple $(c, \mathbf{z}) \in \mathcal{C} \times R^{k}$. Cryptographic hash function $H : \{0, 1\}^{*} \to \mathcal{C}$.

Output: Bits 0 or 1 corresponding to Reject/Accept.

1: if $\|\mathbf{z}\|_{\infty} > 6\sigma$, return 0
2: if $c \neq H(\mathbf{A}, \mathbf{t}, \mathbf{Az} - \mathbf{t}c \mod q)$, return 0
3: return 1

Figure 3

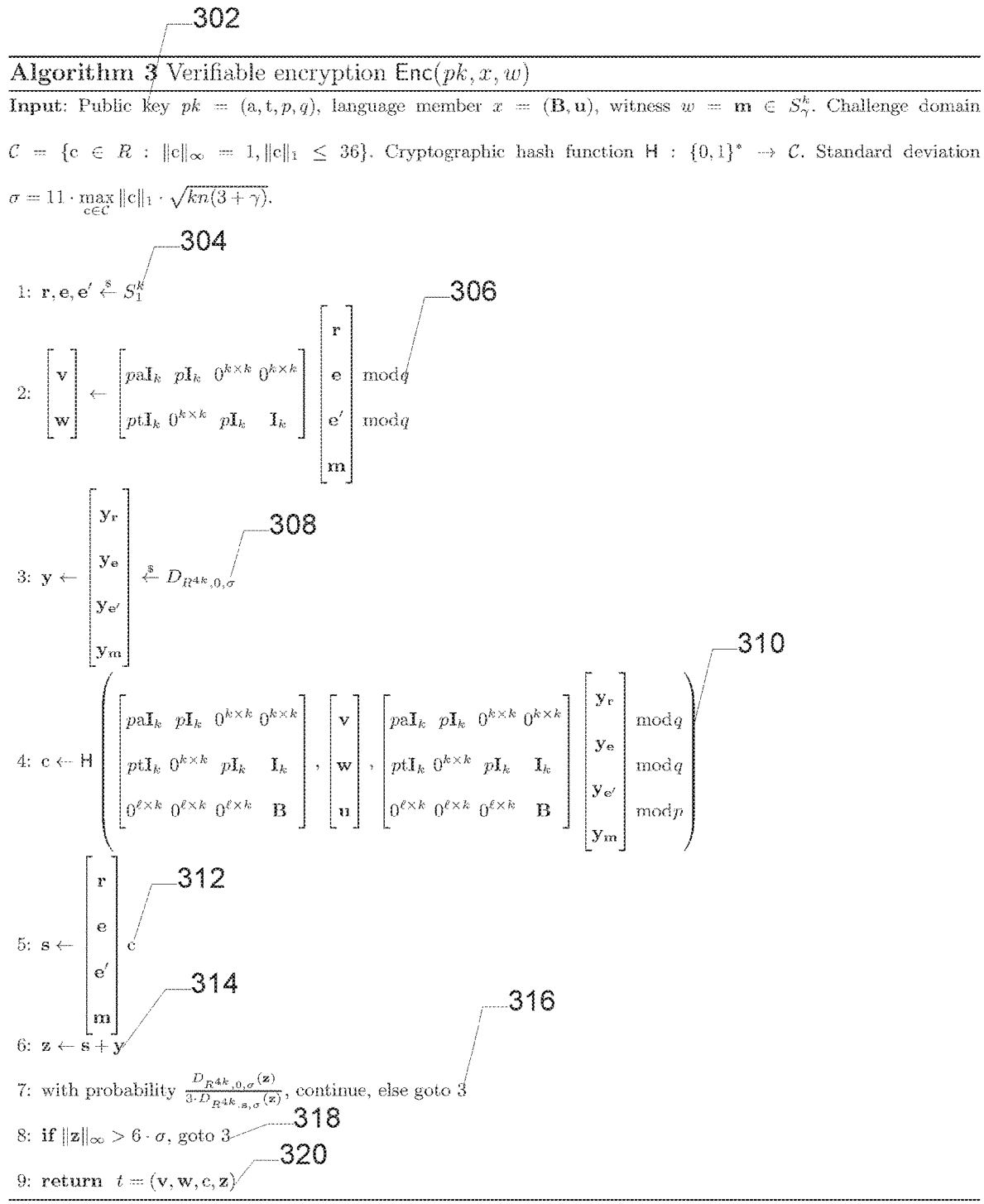

Algorithm 3 Verifiable encryption $\mathsf{Enc}(pk, x, w)$

Input: Public key $pk = (\mathbf{a}, \mathbf{t}, p, q)$, language member $x = (\mathbf{B}, \mathbf{u})$, witness $w = \mathbf{m} \in S_\gamma^k$. Challenge domain $\mathcal{C} = \{c \in R : \|c\|_\infty = 1, \|c\|_1 \leq 36\}$. Cryptographic hash function $\mathsf{H} : \{0,1\}^* \to \mathcal{C}$. Standard deviation $\sigma = 11 \cdot \max_{c \in \mathcal{C}} \|c\|_1 \cdot \sqrt{kn(3+\gamma)}$.

1: $\mathbf{r}, \mathbf{e}, \mathbf{e}' \xleftarrow{\$} S_1^k$

2: $\begin{bmatrix} \mathbf{v} \\ \mathbf{w} \end{bmatrix} \leftarrow \begin{bmatrix} p\mathbf{a}\mathbf{I}_k & p\mathbf{I}_k & 0^{k \times k} & 0^{k \times k} \\ p\mathbf{t}\mathbf{I}_k & 0^{k \times k} & p\mathbf{I}_k & \mathbf{I}_k \end{bmatrix} \begin{bmatrix} \mathbf{r} \\ \mathbf{e} \\ \mathbf{e}' \\ \mathbf{m} \end{bmatrix} \begin{array}{l} \bmod q \\ \bmod q \end{array}$ 3: $\mathbf{y} \leftarrow \begin{bmatrix} \mathbf{y}_r \\ \mathbf{y}_e \\ \mathbf{y}_{e'} \\ \mathbf{y}_m \end{bmatrix} \xleftarrow{\$} D_{R^{4k}, 0, \sigma}$ 4: $c \leftarrow \mathsf{H}\left( \begin{bmatrix} p\mathbf{a}\mathbf{I}_k & p\mathbf{I}_k & 0^{k \times k} & 0^{k \times k} \\ p\mathbf{t}\mathbf{I}_k & 0^{k \times k} & p\mathbf{I}_k & \mathbf{I}_k \\ 0^{\ell \times k} & 0^{\ell \times k} & 0^{\ell \times k} & \mathbf{B} \end{bmatrix}, \begin{bmatrix} \mathbf{v} \\ \mathbf{w} \\ \mathbf{u} \end{bmatrix}, \begin{bmatrix} p\mathbf{a}\mathbf{I}_k & p\mathbf{I}_k & 0^{k \times k} & 0^{k \times k} \\ p\mathbf{t}\mathbf{I}_k & 0^{k \times k} & p\mathbf{I}_k & \mathbf{I}_k \\ 0^{\ell \times k} & 0^{\ell \times k} & 0^{\ell \times k} & \mathbf{B} \end{bmatrix} \begin{bmatrix} \mathbf{y}_r \\ \mathbf{y}_e \\ \mathbf{y}_{e'} \\ \mathbf{y}_m \end{bmatrix} \begin{array}{l} \bmod q \\ \bmod q \\ \bmod p \end{array} \right)$ 5: $\mathbf{s} \leftarrow \begin{bmatrix} \mathbf{r} \\ \mathbf{e} \\ \mathbf{e}' \\ \mathbf{m} \end{bmatrix} c$ 6: $\mathbf{z} \leftarrow \mathbf{s} + \mathbf{y}$ 7: with probability $\frac{D_{R^{4k},0,\sigma}(\mathbf{z})}{3 \cdot D_{R^{4k},\mathbf{s},\sigma}(\mathbf{z})}$, continue, else goto 3

8: if $\|\mathbf{z}\|_\infty > 6 \cdot \sigma$, goto 3

9: return $t = (\mathbf{v}, \mathbf{w}, c, \mathbf{z})$

Figure 4

---
Algorithm 4 Verification $V(pk, x, t)$
---
Input: Public key $pk = (a, t, p, q)$, language member $x = (B, u)$, ciphertext $t = (v, w, c, z)$. Cryptographic hash function H, positive real $\sigma$ as in Algorithm 3.

1: if $\|z\|_\infty > 6 \cdot \sigma$ , return 0

2: if $c \neq H\left( \begin{bmatrix} paI_k & pI_k & 0^{k \times k} & 0^{k \times k} \\ ptI_k & 0^{k \times k} & pI_k & I_k \\ 0^{\ell \times k} & 0^{\ell \times k} & 0^{\ell \times k} & B \end{bmatrix}, \begin{bmatrix} v \\ w \\ u \end{bmatrix}, \begin{bmatrix} paI_k & pI_k & 0^{k \times k} & 0^{k \times k} \\ ptI_k & 0^{k \times k} & pI_k & I_k \\ 0^{\ell \times k} & 0^{\ell \times k} & 0^{\ell \times k} & B \end{bmatrix} z - c \begin{bmatrix} v \\ w \\ u \end{bmatrix} \begin{matrix} \mod q \\ \mod q \\ \mod p \end{matrix} \right)$, return 0

3: return 1
---

Algorithm 5 Decryption Dec($sk, x, t$)

Input: Secret key $sk = s_1$, language member $x = (\mathbf{B}, \mathbf{u})$, ciphertext $t = (\mathbf{v}, \mathbf{w}, c, \mathbf{z})$.

1:  if $V(pk, x, t) = 1$ then —504
2:    loop —506
3:      $c' \xleftarrow{\$} C$ —508
4:      $\bar{c} \leftarrow c - c'$ —510
5:      $\bar{m} \leftarrow (\mathbf{w} - \mathbf{v}s_1)\bar{c} \bmod q$ —512
6:      if $\|\bar{m}\|_\infty < q/2C$ then —514
7:        $\bar{m} \leftarrow \bar{m} \bmod p$ —516
8:        return $(\mathbf{m}, \bar{c})$ —518
9:      end if —520
10:   end loop —522
11: end if —524

500

FLEXIBLE VERIFIABLE ENCRYPTION FROM LATTICES

BACKGROUND

The present invention relates to techniques for providing one-shot verifiable encryption utilizing lattice problems.

Verifiable encryption allows one to prove properties about encrypted data and is an important building block in the design of cryptographic protocols, for example, group signatures, key escrow, fair exchange protocols, etc. Existing lattice-based verifiable encryption schemes, and even just proofs of knowledge of the encrypted data, require parallel composition of proofs to reduce the soundness error, resulting in proof sizes that are only truly practical when amortized over a large number of ciphertexts.

Lattice problems may be used for cryptographic systems because they may offer better security than discrete logarithm and factoring based problems. Efficient lattice-based constructions are known for signature and encryption schemes. Lattice cryptography has matured to the point where it appears that any cryptographic operation that can be performed based on any other technique can also be performed based on a lattice technique.

Lattice-based public-key encryption schemes and digital signature schemes, based on NTRU and Ring-LWE problems, are essentially as practical as the non-lattice based ones. All keys and outputs are less than 1 kilobyte for 128 bits of security. Slightly more advanced operations, such as identity-based encryption, can be implemented with keys and ciphertexts being around 4 kilobytes, and blind signatures have outputs of around 100 kilobytes. Other operations, however, are usually less practical.

One such operation is public-key encryption with proofs of plaintext knowledge, which allow the encryptor to create a non-interactive zero-knowledge proof of knowledge of the plaintext contained in a given ciphertext. For example, suppose that a sender encrypted a plaintext into a ciphertext using a public key. Proof of plaintext knowledge allows the sender to convince a receiver, who does not have the secret key, that the sender knows the plaintext. Zero-knowledge proofs are those in which the proof of plaintext knowledge does not reveal any information about the plaintext to the receiver. Verifiable encryption with respect to a binary relation on the plaintext is a zero-knowledge proof on the public inputs including the private key, the ciphertext, and the binary relation, that allows the sender to convince the receiver that the ciphertext is an encryption of the plaintext using the public key. Conventional proofs of plaintext knowledge for lattice-based encryption schemes may use the adaptation of Sterns protocol or the single-bit-challenge version of the lattice-based Fiat-Shamir protocol. However, these conventional schemes have soundness errors, requiring the proof to be repeated, for example, 128 times, to reduce the soundness errors to a negligible quantity.

Accordingly, a need arises for techniques for performing public-key encryption with proofs of plaintext knowledge using a lattice-based scheme that provides improved efficiency over conventional techniques.

SUMMARY

Embodiments of the present invention may provide the capability for performing public-key encryption with proofs of plaintext knowledge using a lattice-based scheme that provides improved efficiency over conventional techniques.

Embodiments of the present methods and systems may provide a verifiable encryption scheme, based on the hardness of the Ring-LWE problem, for short solutions to linear equations over polynomial rings. Embodiments may be considered "one-shot,", in the sense that, a single instance of the proof already has negligible soundness error, yielding compact proofs even for individual ciphertexts. Whereas verifiable encryption usually guarantees that decryption can recover a witness for the original language, in embodiments of the present methods and system, this requirement may be relaxed to decrypt a witness of a related but extended language. This relaxation may be sufficient for many applications as may be illustrated this with example usages of embodiments in key escrow and verifiably encrypted signatures.

One aspect of embodiments of the present methods and systems is that the decryption algorithm may be probabilistic and may use the proof as input (rather than using only the ciphertext). The decryption time for honestly-generated ciphertexts may depend only on the security parameter, while the expected running time for decrypting an adversarially-generated ciphertext may be directly related to the running time of the adversary who created it. This property suffices in many embodiments, especially in those where the ciphertext proof is part of an interactive protocol, where the decryptor is substantially more powerful than the adversary, or where adversaries can be otherwise discouraged to submit malformed ciphertexts.

For example, in an embodiment, a computer-implemented method of verifying encryption may comprise generating a ciphertext comprising a plaintext encrypted by a lattice-based encryption scheme and proving that the ciphertext is valid by generating at least one challenge value, using a decryption procedure that recovers a plaintext by choosing at least one additional challenge value at random from a challenge space.

For example, in an embodiment, the decryption procedure may repeatedly choose additional challenge values until one of the values together with the proof produce a valid ciphertext. The encryption scheme may be a Ring-LWE encryption scheme that generates: (v,w), wherein $v \leftarrow p(ar+e)$ and $w \leftarrow p(tr+e')+m$, the secret keys are $$s_1, s_2 \xleftarrow{\$} S_1,$$

and the public keys are $$a \xleftarrow{\$} R_q, \text{ and } t \leftarrow as_1 + s_2,$$

wherein $R_q$ is the ring of polynomials $Z_q[x]/(x^n+1)$ with n a power of 2 and q prime, and where $S_1$ is the set of polynomials in $R_q$ with coefficients that are zero or one. The decryption scheme may comprise selecting a challenge c' at random from the challenge space $C \subseteq S_1$, generating $\bar{c}=c-c'$, wherein c is a challenge value in the ciphertext proof, determining whether $$\bar{c} \begin{bmatrix} v \\ w \end{bmatrix} \bmod q$$

is a valid ciphertext, and if $$\overline{c}\begin{bmatrix}v\\w\end{bmatrix} \bmod q$$

is a valid ciphertext, then decrypting the ciphertext, otherwise, selecting a new random c'. The decryption scheme may comprise computing $m'=(w-vs_1)(c-c') \bmod q$, checking that c and c' produce a valid ciphertext by checking a bound on the norm of m', and if c and c' produce a valid ciphertext, outputting $m=m' \bmod p$ as part of the decrypted plaintext.

For example, in an embodiment, a computer program product for verifying encryption may comprise a non-transitory computer readable storage having program instructions embodied therewith, the program instructions executable by a computer, to cause the computer to perform a method comprising generating a ciphertext comprising a plaintext encrypted by a lattice-based encryption scheme and proving that the ciphertext is valid by generating at least one challenge value, using a decryption procedure that recovers a plaintext by choosing at least one additional challenge value at random from a challenge space.

For example, in an embodiment, a system for verifying encryption may comprise a processor, memory accessible by the processor, and computer program instructions stored in the memory and executable by the processor to perform generating a ciphertext comprising a plaintext encrypted by a lattice-based encryption scheme and proving that the ciphertext is valid by generating at least one challenge value, using a decryption procedure that recovers a plaintext by choosing at least one additional challenge value at random from a challenge space.

BRIEF DESCRIPTION OF THE DRAWINGS

The details of the present invention, both as to its structure and operation, can best be understood by referring to the accompanying drawings, in which like reference numbers and designations refer to like elements.

FIG. 2 is an exemplary flow diagram of an embodiment of a verification process.

FIG. 3 is an exemplary flow diagram of an embodiment of a verifiable encryption process.

FIG. 4 is an exemplary flow diagram of an embodiment of a verification process.

FIG. 5 is an exemplary flow diagram of an embodiment of a decryption process.

DETAILED DESCRIPTION

Figure 1:
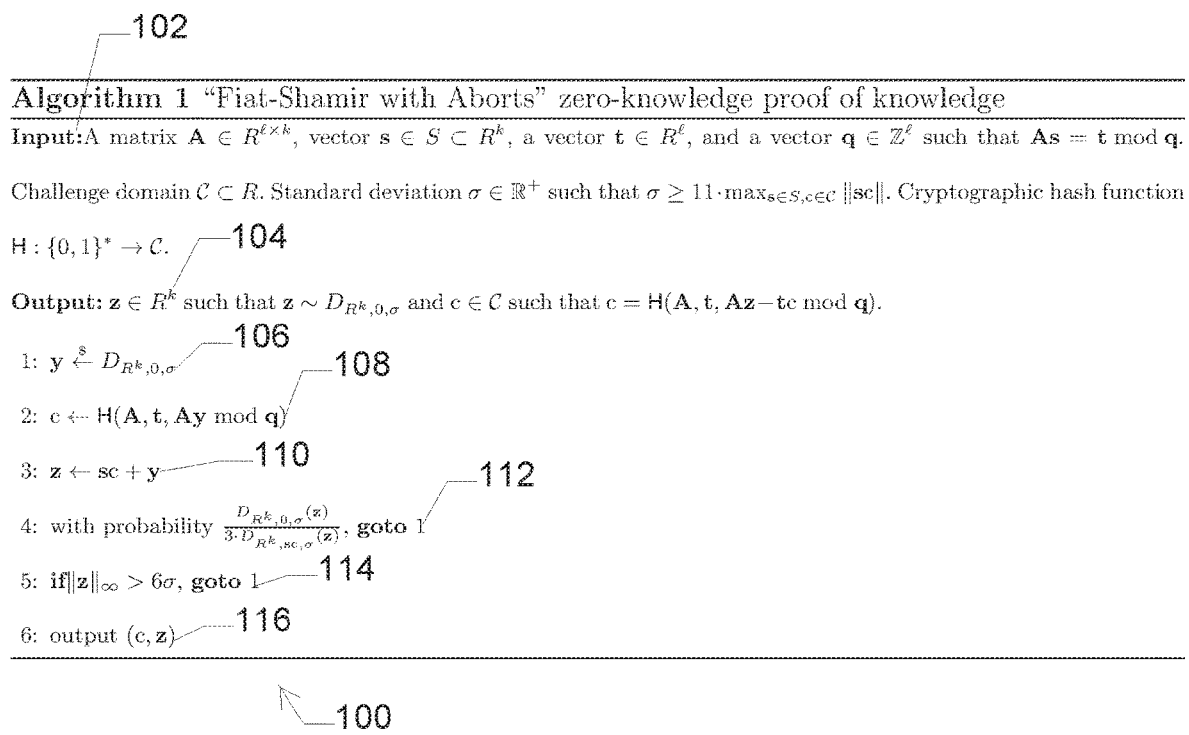
FIG. 1 is an exemplary flow diagram of an embodiment of a signing protocol.

Lattice cryptography has matured to the point where the general belief is that any primitive that can be constructed from any other assumption can also be constructed based on a lattice assumption. The main question that remains is how efficient (in a practical, rather than asymptotic, sense) one can make the lattice-based constructions. A primitive that has been getting a lot of recent attention is a "proof of plaintext knowledge."

In a proof of plaintext knowledge, a prover who has a message $\mu$ produces a ciphertext $t=Enc(\mu)$ and a zero-knowledge proof of knowledge $\pi$ showing that he knows the value of Dec(t). Proving knowledge of the value of Dec(t) is typically the same as proving that t is a correctly formed ciphertext along with proving the knowledge of $\pi$ that was used to construct it.

By itself, a proof of plaintext knowledge may not be particularly useful, and it is almost always used as a part of a primitive known as a verifiable encryption scheme. In such a scheme, there is a relation $R_L$ and a language $$L=\{x: \exists w \text{ s.t. } R_L(x,w)=1\}.$$

Thus the value w is a witness to the fact that x is in the language L. The relation $R_L$ and the element x are public, while the prover possesses the secret witness w. He then produces an encryption $t=Enc(w)$ as well as a zero-knowledge proof of knowledge $\pi$ that he knows the value $w=Dec(t)$ and that w satisfies $R_L(x, w)=1$.

Verifiable encryption schemes may be used as building blocks for many primitives. Examples of such primitives may include group signatures, wherein a group manager may provide distinct signing keys to all users, which they may use to anonymously sign messages. A trusted opener is able to trace back a signature to the identity of the signer. A common construction is to let users verifiably encrypt their identity under the opener's public key together with a proof that they know a signature by the group manager on the same identity. Another example is key escrow protocols, wherein users encrypt their decryption key under the public key of a trusted escrow authority. Using verifiable encryption, communication partners or network providers may check that the ciphertext indeed encrypts the user's decryption key, and not some bogus data. Another example is optimistic fair exchange protocols, wherein two parties may fairly exchange secrets by proving that they encrypted their respective secrets under the public key of a trusted authority. The trusted authority may later be called upon to recover the secret in case one of the parties has aborted the protocol early. Another example is verifiable secret sharing, wherein one dealer sends verifiably encrypted shares of a secret to a set of parties, and proves to an external third party that the ciphertexts contain actual shares of the secret.

If a lattice-based encryption scheme based on LWE or Ring-LWE is used, then the encryption of a message m satisfies the linear relation $$A\begin{bmatrix}r\\m\end{bmatrix} = t \bmod q.$$

There are several conventional techniques to prove that the ciphertext t is well-formed and one knows the message m. However, these conventional techniques have significant disadvantages, such as large soundness errors that require a large number of repetitions in order to achieve acceptable security levels.

Embodiments of the present methods and systems may involve a "one-shot" protocol for proving plaintext knowledge. In this technique, the running time of the decryption algorithm depends on the running time of the prover. In particular, embodiments of the present decryption algorithm may be randomized in that they may try to decrypt ciphertexts that are "close" to the one provided by the prover. Embodiments of the present methods and systems may provide an expected number of decryption tries needed by the decryptor that are within a small factor (essentially 1) of the number of random oracle queries that the prover makes while constructing the proof of knowledge π. If the prover is honest, though, then the decryptor will succeed on the first try.

While tying the decryption time to the adversary's running time is unusual, this should be acceptable in many scenarios. Apart from creating out-of-band incentives such as fines to prevent cheating, there are also technical ways to limit the power of the adversary.

If the protocol in which the proof of knowledge is being used is interactive, then the verifier may send the prover a fresh salt during every interaction that has to be included in the cryptographic hash function (modeled as a random oracle) and require that the prover performs the proof within a certain small amount of time. Thus the adversary will have a limited time-frame during which queries may be made to the random oracle (because each new salt in essence creates a new random oracle). The decryption algorithm, on the other hand, is almost always off-line and is therefore allowed more time. In non-interactive settings, the prover may be required to use a salt from a public "randomness beacon", such as one provided by the National Institute for Standards and Technology (NIST) at the time the proof was created.

The proof of plaintext knowledge may be built upon to construct a verifiable encryption scheme that is adapted to be used as a building block for lattice constructions. The relations that are most common in lattice cryptography are those of the form $$Bm = u \bmod p \quad (1)$$

where B is a matrix over some ring, m is a vector with small coefficients, and u is the product of Bm modulo p. For example, in (Ring)-LWE encryption B, u is the public key and m is the secret key. In full domain hash signatures, B is the public key, m is the signature, and $u=H(\mu)$ is derived from the message $\mu$. Giving a verifiable encryption scheme for such relations is a main building block for many of the protocols listed in the introduction.

While verifiable encryption would normally guarantee that decrypting a valid ciphertext yields a witness satisfying (1), this guarantee may be relaxed to only yield a witness ($\overline{m}, \overline{c}$) with small coefficients satisfying $$\overline{Bm} = \overline{cu} \bmod p. \quad (2)$$

This relaxation may be sufficient for many applications of verifiable encryption. Lattice schemes may also be augmented to allow for relations of the form (2) to be "useful" whenever those of the form (1) are, as may be seen in examples described below.

It may appear as if the decryption and the proof of knowledge are disjoint. The proof of knowledge n may prove the existence of some witness ($\overline{m}, \overline{c}$), whereas the decryption algorithm may obtain a completely different witness ($\overline{m}', \overline{c}'$). But in addition to still being sufficient for many applications, there is also a connection between the two tuples, namely $$\overline{m}/\overline{c} = \overline{m}'/\overline{c}' \bmod p.$$

While this property is not needed in many applications, the presence of this relationship may be useful when constructing group signatures or other primitives where it is important that the decryption recovers some specific attribute of the prover rather than just a witness to a relation.

The efficiency of the verifiable encryption scheme may be affected by the size of the modulus p and the witness m in the relation. The larger these values, the larger the proofs and ciphertexts may be.

For a set $$S, \alpha \xleftarrow{\$} S$$

means that a is chosen uniformly at random from S. If D is a distribution, then $$\alpha \xleftarrow{\$} D$$

signifies that a is randomly chosen according to the distribution D. The assignment operator $a \leftarrow b$ signifies that a gets assigned the value b. Column vectors may be written in the form $$\begin{bmatrix} a_1 \\ \ldots \\ a_k \end{bmatrix} \text{ as } [a_1; \ldots; a_k].$$

The ring $\mathbb{Z}[x]/(x^n+1)$. Consider the ring $R = \mathbb{Z}[x]/(x^n+1)$ and $R_q = \mathbb{Z}_q[x]/(x^n+1)$ where n is a power of 2 integer and q is some prime. The elements of the latter ring are polynomials of degree at most $n-1$ with coefficients between $-(q-1)/2$ and $(q-1)/2$ (for the ring R, there is no restriction on the sizes of coefficients). All definitions that follow apply both to R and $R_q$. Elements of $\mathbb{Z}$ and of R are denoted by lower-case letters, elements of vectors in $R^k$ by bold lower-case letters, and of matrices in $R^{k \times l}$ by bold upper-case letters.

The norms $\ell_1, \ell_2, \ell_\infty$ and are defined as the lengths of an element $$a = \sum_{i=0}^{n-1} a_i x^i \in R$$

as $$\|a\|_1 = \sum_{i=0}^{n-1} |a_i|, \quad \|a\| = \sqrt{\sum_{i=0}^{n-1} a_i^2} \text{ and } \|a\|_\infty = \max_i (|a_i|)$$

respectively. Since $\mathbb{Z}_q$ is a finite group, these do not correspond exactly to norms when working in $R_q$ because it is not the case that $\|a \cdot a\| = a \cdot \|a\|$. The other two properties of norms (i.e. that the norm of 0 is 0 and the triangle inequality) do hold. For k-dimensional vectors $a = [a_1 | \ldots | a_k] \in R^k$, then $\|a\|_1 = \|a_1\|_1 + \ldots + \|a_k\|_1$, $\|a\| = \sqrt{\|a_1\|^2 + \ldots + \|a_k\|^2}$ and $\|a\|_\infty = \max_i \|a_i\|_\infty$. The set of elements of R (resp. of $S^k$) whose $l_\infty$ length is at most i is denoted by $S_i$ (respectively $S_i^k$).

It is not hard to check that for any two polynomials a, $b \in R$, we have $\|ab\|_\infty \leq \|a\|_1 \cdot \|b\|_\infty$ and $\|ab\|_\infty \leq \|a\| \cdot \|b\|$. Similarly for a, $b \in R^k$, we have same inequalities on the $\ell_\infty$ norms of their inner products: that is, $\|a \cdot b\|_\infty \leq \|a\|_1 \cdot \|b\|_\infty$ and $\|a \cdot b\|_\infty \leq \|a\| \cdot \|b\|$.

Special Properties of $\mathbb{Z}_q[x]/(x^n+1)$. The algebraic properties of the ring $R_q = Z_q[x]/(x^n+1)$, where n is a power of 2, depend on the prime q. For efficiency, one often takes q=1 mod (2n), which results in the polynomial $x^n=1$ splitting into n linear factors modulo q. Operations within the ring can then be performed extremely efficiently using the number theory transform. On the other hand, one sometimes wants the ring to be "almost a, field". In particular, it is sometimes desirable for the ring to have many invertible elements. While there do not exist q that will make $R_q$ a field, using q=3 mod 8 has the effect that $x^n+1$ factors into two irreducible polynomials of degree n/2 and so the ring $R_q$ contains $q^n-2q^{n/2}+1$ invertible elements. By the Chinese Remainder theorem, it is also easy to see that all elements of degree less than n/2 are invertible.

In an embodiment, q=5 mod 8 may be set. Modulo such a q, the polynomial $x^n+1$ also factors into two irreducible polynomials of degree n/2. And in addition to all elements of degree less than n/2 being invertible, one can also show that all elements (of degree up to n) with small coefficients are invertible as well. The Lemma below are presented as illustrative examples:

Lemma 1: Let q=5(mod 8) be prime and r be an integer such that $r^2=-1 \pmod q$. Then for all positive integers κ, the polynomials $x^{2\kappa}-r$ and $x^{2\kappa}+r$ are irreducible over $\mathbb{Z}_q[x]$. And in particular, the complete factorization into irreducibles over $\mathbb{Z}_q[x]$ of the polynomial $x^{2\kappa+1}+1$ is $x^{2\kappa+1}+1=(x^{2\kappa}-r)(x^{2\kappa}+r)$ mod q.

Lemma 2: Let $R_q=\mathbb{Z}_q[x]/(x^n+1)$ where n>1 is a power of 2 and q is a prime congruent to 5(mod 8). This ring has exactly $2q^{n/2}-1$ elements without an inverse. Moreover, every non-zero polynomial a in $R_q$ with $\|a\|_\infty < \sqrt{q/2}$ has an inverse.

These exemplary Lemma may be shown as follows, given that the reduction modulo q will be implicit. By Lemma 1, $x^n+1=(x^{n/2}-r)(x^{n/2}+r)$ where $r^2=-1$ and $x^{n/2}\pm r$ are irreducible. Any element $a \in R_q$ can be written as $a=a_0+x^{n/2}a_1$, where $a_0, a_1$ are polynomials in $\mathbb{Z}[x]$ of degree less than n/2. Then the Chinese remainder decomposition of a is $CRT(a)=a \bmod(x^{n/2}-r), a \bmod(x^{n/2}+r))=(a_0+ra_1, a_0-ra_1)$ If a is not invertible, it means that either $a_0+ra_1=0$ or $a_0-ra_1=0$. If $a_1=0$, then $a_0=0$ and a is the zero polynomial. If $a_1 \neq 0$, then some coefficient of $a_0$, say $a_0$, must be equal to $\pm ra_1$, where $a_1$ is a non-zero coefficient of $a_1$. Therefore we have $a_0^2=(\pm ra_1)^2=-a_1^2$. In other words, $a_0^2+a_1^2=0$. But since we assumed that $|a_0|, |a_1| < \sqrt{q/2}$ this is not possible, and thus shows the second example by contradiction. The first example follows from the fact that CRT is a bijection and all the elements without an inverse must be 0 modulo at least one of $x^{n/2} \pm r$.

Lattices and the Discrete Gaussian Distribution. A full-rank integer lattice $\wedge$ of dimension n is an additive subgroup of $\mathbb{Z}^n$. This lattice is generated by some basis $B=[b_1| \ldots |b_n] \in \mathbb{Z}^{n \times n}$. If a basis B is a generator for a lattice $\wedge$, we will write $\mathcal{L}(B)=\wedge$.

For a matrix $A \in \mathbb{Z}^{n \times m}$, it is defined that $\mathcal{L}^\perp(A)=\{y \in \mathbb{Z}^m: Ay=0 \bmod q\}.$ (3)

It may be seen that $\mathcal{L}^\perp(A)$ is a full-rank lattice of dimension m.

For a full-rank integer lattice $\wedge$, the discrete Gaussian distribution $$D_{\wedge,c,\sigma}(v) = e^{\frac{-\|v-c\|^2}{2\sigma^2}} / \sum_{w \in \wedge} e^{\frac{-\|w-c\|^2}{2\sigma^2}}$$

may be defined for any $v \in \wedge$, and 0 on all other points in space.

For the special case of $\wedge=\mathbb{Z}^m$, it is known that $$\Pr_{s \leftarrow D_{\mathbb{Z}^m,0,\sigma}}[\|s\|_\infty > t\sigma] < 2m \cdot e^{-t^2/2},$$

which implies that for t–6, the probability that any coefficient of s is greater than 6 σ is less than $m \cdot 2^{-25}$.

Polynomial Lattices and Sampling over the ring R. Herein, rather than working over the ring $\mathbb{Z}_q$ (with the usual addition and multiplication operation modulo q), working over the ring $R=\mathbb{Z}_q[x]/(x^n+1)$ will be used with the usual addition and multiplication operations modulo q and $x^n+1$. Analogously to (3), for a vector $A \in R^{1 \times m}$, a lattice $\mathcal{L}^{195}(A)$ may be defined as $\mathcal{L}^\perp(A)=\{y \in (\mathbb{Z}[x]/(x^n+1))^m: Ay=0 \bmod q\}.$ Note that while it is an m-dimensional lattice over $\mathbb{Z}[x]/(x^n+1)$, it is really an nm-dimensional lattice over $\mathbb{Z}$.

In order to generate a discrete Gaussian sample over $\mathbb{Z}[x]/(x^n+1)$, the sample may be generated over $\mathbb{Z}^n$ and then mapped into $\mathbb{Z}[x]/(x^n+1)$ using the obvious embedding of coordinates into coefficients of the polynomials. This may be written $$y \xleftarrow{\$} D_{R,0,\sigma}$$

to mean that y is generated according to $D_{\mathbb{Z}^n,c,\sigma}$ and then interpreted as an element of R. Similarly, we write $$(y_1,\ldots,y_l) \xleftarrow{\$} D_{R^l,0,\sigma}$$

to mean that z is generated according to $D_{\mathbb{Z}^{ln},0,\sigma}$ and then gets interpreted as l polynomials $y_i$.

Ring-LWE Encryption Scheme. In describing the Ring-LWE encryption scheme, for simplicity, the distribution of the secret keys and the randomness may be taken to be uniformly-random elements with $\ell_\infty$ norm 1. The secret keys may be chosen as $$s_1, s_2 \xleftarrow{\$} S_1$$

and the public keys may be $$a \xleftarrow{\$} R_q \quad \text{and} \quad t \xleftarrow{} as_1 + s_2.$$

There is also a public parameter p>2, which is a positive integer. To encrypt a message $m \in f_p$, the encryptor chooses $$r, e, e' \xleftarrow{\$} S_I$$

and outputs (v, w) where v←p(ar+e) and w×p(tr+e')+m. The decryption procedure computes $$w - v s_1 \bmod q \bmod p = p(rs_2 + e' - es_1) + m \bmod p = m, \quad (4)$$

where the last equality holds in the case that $\|p(rs_2+e'-es_1)+m\|_\infty < q/2$.

From the above equations, it is seen that the encryption of a plaintext m under public keys a, t is a ciphertext v, w satisfying the equation $$\begin{bmatrix} v \\ w \end{bmatrix} = \begin{bmatrix} pa \mid p \mid 0 \mid 0 \\ pt \mid 0 \mid p \mid 1 \end{bmatrix} \begin{bmatrix} r \\ e \\ e' \\ m \end{bmatrix} \bmod q, \quad (5)$$

Extending this, the encryption of k messages $m_1, \ldots, m_k$ under the same public key a, t satisfies the following relation:

$$2k \left\{ \begin{bmatrix} \overbrace{\begin{matrix} pa & & p & & & & \\ & \ddots & & \ddots & & & \\ & & pa & & p & & \\ pt & & & & p & & 1 \\ & \ddots & & & & \ddots & \\ & & pt & & & & p & 1 \end{matrix}}^{4k} \end{bmatrix} \begin{bmatrix} r_1 \\ \ldots \\ r_k \\ e_1 \\ \ldots \\ e_k \\ e'_1 \\ \ldots \\ e'_k \\ m_1 \\ \ldots \\ m_k \end{bmatrix} \right. = \begin{bmatrix} v_1 \\ \ldots \\ v_k \\ w_1 \\ \ldots \\ w_k \end{bmatrix} \bmod q, \quad (6)$$

which may be written in abbreviated form as $$\begin{bmatrix} pa I_k & p I_k & 0^{k \times k} & 0^{k \times k} \\ pt I_k & 0^{k \times k} & p I_k & I_k \end{bmatrix} \begin{bmatrix} r \\ e \\ e' \\ m \end{bmatrix} = \begin{bmatrix} v \\ w \end{bmatrix} \bmod q, \quad (7)$$

where $I_k$ corresponds to an identity matrix of dimension k and $0^{\ell \times k}$ corresponds to an $\ell \times k$ matrix of all zeroes. The decryption procedure is then simply the vector analogy of (4). i.e.

$$m = w - v s_1 \bmod q \bmod p.$$

"Fiat-Shamir with Aborts" Proofs of Knowledge of Linear Relations. A technique for constructing practical digital signatures (in the random oracle model) may be based on the hardness of lattice problems. At the heart of the construction is a zero-knowledge proof of knowledge that, given an $s \in R^k$ satisfying the relation $$As = t \bmod q, \quad (8)$$

proves the knowledge of low-norm $\bar{s}$ and c that satisfy $$A\bar{s} = ct \bmod q.$$

In this construct a Σ-protocol may be constructed with the prover not always having to output the result. In particular, the protocols may use rejection sampling to tailor the distribution so that it does not depend on the secret s. For example, this rejection sampling may be done by making the resulting distribution uniform in a box, or the more efficient approach of making it a discrete Gaussian. The interactive protocol may then be converted to a non-interactive one using the Fiat-Shamir technique. This combined technique may be referred to as "Fiat-Shamir with Aborts".

An embodiment of a signing protocol 100 is shown in FIG. 1. This protocol is honest-verifier zero knowledge since a simulator can simply output $$z \xleftarrow{\$} D_{R^k, 0, \sigma}$$

and $$c \xleftarrow{\$} \mathcal{C}$$

and program c=H(A, t, Az−tc mod q). Because the entropy of z is high, there is a very low probability that the value for H(A, t, Az−tc mod q) was previously assigned. Further, the same modulus q need not be used for every row of the relation in (8). Instead a different modulus may be used for each row, which may be represented in the protocol by a vector q.

Protocol 100 accepts as input 102 a matrix $A \in R^{\ell \times k}$, vector $s \in S \subset R^k$, a vector $t \in R^\ell$, and a vector $q \in \mathbb{Z}^\ell$ such that As=t mod q. The challenge domain is $\mathcal{C} \subset R$. The standard deviation is $\sigma \in \mathbb{R}^+$ such that $\sigma \geq 11 \cdot \max_{s \in S, c \in \mathcal{C}} \|sc\|$. The cryptographic hash function is $H: \{0,1\}^* \to \mathcal{C}$. Protocol 100 produces as output 104 $z \in R^k$ such that $z \sim D_{R^k, 0, \sigma}$ and $c \in \mathcal{C}$ such that c=H(A, t, Az−tc mod q). Protocol 100 begins with step 106, in which $$y \xleftarrow{\$} D_{R^k, 0, \sigma}.$$

At step 108, c←H(A, t, Ay mod q). At step 110, z←sc+y. At step 112, process 100 may loop back to step 102 with a probability $$\frac{D_{R^k, 0, \sigma}(z)}{3 \cdot D_{R^k, sc, \sigma}(z)}.$$

At step 114, it is determined whether $\|z\|_\infty > 6\sigma$. If so, process 100 may loop back to step 102. At step 116, process 100 may output (c, z).

A corresponding verification process 200 for the "Fiat-Shamir with Aborts" technique is shown in FIG. 2. Process 200 takes as input 202, a matrix $A \in R^{\ell \times k}$, a vector $t \in R^{\ell}$, a vector $q \in \mathbb{Z}^{\ell}$, $\sigma \in \mathbb{R}^+$, a tuple $(c,z) \in \mathcal{C} \times R^k$ and a cryptographic hash function $H: \{0,1\}^* \to \mathcal{C}$. Process 200 produces as output 204 bits 0 or 1 corresponding to Reject/Accept. Process 200 begins with step 206 in which it is determined if $\|z\|_\infty > 6\sigma$, then return 0, indicating that the verification has failed. At step 208, it is determined if $c \neq H(A, t, Az-tc \mod q)$, then return 0, indicating that the verification has failed. Otherwise, at step 210, 1 is returned, indicating that the verification has succeeded.

An additional factor is simulation soundness, meaning that an adversary cannot create proofs of incorrect statements, even after seeing simulated proofs of incorrect statements. Fiat-Shamir proofs are simulation-sound if the underlying three-move protocol is honest-verifier zero-knowledge and has "quasi-unique responses", meaning that an adversary cannot create two accepting transcripts that are different only in the response value. This translates into finding $z \neq z'$ such that $Az - Az' \mod q$ be hard. Finding such $z, z'$ would imply that $A(z-z') = 0 \mod q$ where A is the matrix in Equation 7. Thus, there is either a non-zero tuple $(y_1, y_2) \in R_q$ with $l_\infty$ norm less than $12\sigma$ such that $ay_1 + py_2 = 0 \mod q$ or $py_1 + y_2 = 0 \mod q$. In our applications $p > 12\sigma$ and $12\sigma p + 12\sigma < q$, which implies that the second equality is not possible. Also, for many parameter sets, such as the examples shown in Table 1 below, $(24\sigma)^2 < q$, and therefore a standard probabilistic argument can be used to show that for all $y_1, y_2$ of $\ell$ norm less than $12\sigma$, $$\Pr_{a \overset{\$}{\leftarrow} R_q} [ay_1 + py_2 = 0 \mod q] = 2^{-\Omega(n)}.$$

If $(24\sigma)^2 > q$, then the probabilistic argument, no longer applies, but then finding such $(y_1, y_2)$ gives a solution to Ring-SIS, which is a computationally hard problem when the norm of $y_i$ is small-enough with relation to $q$ (which it is in all applications).

Verifiable Encryption for Linear Relations from Ring-LWE. Verifiable encryption may be defined as encrypting a witness for a member of a language. The class of languages includes the linear relations of short vectors in a ring. While soundness may be defined by requiring that decryption of a valid ciphertext always recovers a valid witness, embodiments of the present systems and methods may achieve a relaxed property that recovers a witness for a related "extended" language that includes the original language. This weaker property suffices for many practical applications of verifiable encryption.

Definition of Relaxed Verifiable Encryption. The definitions for verifiable encryption may be relaxed in a number of ways ways. For example, as mentioned above, and analogous to relaxed knowledge extraction for proofs of knowledge, the encryption algorithm may encrypt a witness w for a member x of a language L, but soundness only guarantees that decryption of a valid ciphertext returns a witness w of an extended language $\bar{L}$ instead of L. As another example, rather than looking at verifiable encryption as a combination of a standard public-key encryption scheme with an associated proof system, encryption and proof may be considered as a single algorithm, producing a verifiable ciphertext that includes the proof. This generalization allows for more efficient schemes, in particular embodiments of the present methods and systems that may speed up decryption using information from the proof.

Let $L \subseteq \{0,1\}^*$ be a language with witness relation $R_L$, i.e., $x \in L$ if there exists a witness w such that $(x, w) \in R_L$. Let $\bar{L}$ with witness relation $R_{\bar{L}}$ be an extension of L, meaning that $L \subseteq \bar{L}$ and $R_L \subseteq R_{\bar{L}}$. For the language of linear relations over short vectors, consider the language L with relation $$R_L = \{((B,u),(m,1)) \in (R_p^{\ell \times k} \times R_p^{\ell}) \times (R_p^k \times R_p) : Bm = u \mod p \wedge m \in S_y^k)\}$$

and the extended language $\bar{L}$ with relation $$R_{\bar{L}} = \{((B,u),(\bar{m},\bar{c})) \in (R_p^{\ell \times k} \times R_p^{\ell}) \times (R_p^k \times R_p):$$

$$B\bar{m} = \bar{c}u \mod p \wedge \|\bar{m}\|_\infty < 6\sigma \wedge \bar{c} \in \mathcal{C}\}.$$

A relaxed verifiable encryption scheme for languages L, $\bar{L}$ is a tuple of algorithms (Kg, Enc, V, Dec) where the key generation algorithm $Kg(1^k)$ returns a public and secret key (pk, sk); the encryption algorithm Enc(pk, x, w) returns a verifiable ciphertext t that encrypts the witness w of language member $x \in L$; the verification algorithm V(pk, x, t) returns 1 or 0 indicating whether t encrypts a witness for x; the decryption algorithm Dec(sk, x, t) returns a witness w or a failure symbol $\perp$. For example, the ciphertext t may include a Fiat-Shamir proof of a $\Sigma$-protocol, the proof $\pi = (\text{cmt}, e, \text{rsp})$ may consist of a commitment cmt, a challenge $c = H(pk, x, t, \text{cmt}, \ldots)$ may be generated through a random oracle H, and a there may be a response rsp. The algorithms then should satisfy the following properties:

Correctness. Correctness requires that Dec(sk, x, Enc(pk, x, w)) = w with probability one for all $(x, w) \in R_L$ and all key pairs $$(pk, sk) \overset{\$}{\leftarrow} Kg(1^k).$$

Completeness. For all $(x, w) \in R_L$ and all key pairs $$(pk, sk) \overset{\$}{\leftarrow} Kg(1^k), V(pk, x, Enc(pk, x, w)) = 1$$

with probability one.

Soundness. Soundness requires that a ciphertext with a valid proof for $x \in L$ can with overwhelming probability be decrypted to a valid witness w such that $(x, \bar{w}) \in R_{\bar{L}}$, i.e., the following probability is negligible:

$$\Pr\left[b = 1 \wedge (x, \bar{w}) \notin R_{\bar{L}}: \begin{array}{l}(pk, sk) \overset{\$}{\leftarrow} Kg(1^k), (x, t) \overset{\$}{\leftarrow} A(pk, sk),\\ b \leftarrow V(pk, x, t), \bar{w} \overset{\$}{\leftarrow} Dec(sk, x, t)\end{array}\right].$$

Simulatability. There exists a simulator Sim such that no adversary A can distinguish real from simulated ciphertexts, i.e., the following advantage of A is negligible:

$$\left|\Pr\left[b' = b: \begin{array}{l}b \overset{\$}{\leftarrow} \{0,1\}, (pk, sk) \overset{\$}{\leftarrow} Kg(1^k), (st, x, w) \overset{\$}{\leftarrow} A(pk),\\ t_0 \overset{\$}{\leftarrow} Enc(pk, x, w), t_1 \overset{\$}{\leftarrow} Sim(pk, x), b' \overset{\$}{\leftarrow} A(st, t_b)\end{array}\right] - \frac{1}{2}\right|.$$

Construction. Given a linear relation $$Bm = u \mod p, \quad (9)$$

for a matrix $B \in R_p^{\ell \times k}$, the goal is to produce a ciphertext and a proof that the decryption of this ciphertext is $(\bar{m}, \bar{c})$ that satisfies the relation $$B\bar{m} = u\bar{c} \mod p. \quad (10)$$

Key generation. Key pairs are generated as for the Ring-LWE encryption scheme described above, i.e., by choosing $$s_1, s_2 \xleftarrow{\$} S_1$$

and computing $$a \xleftarrow{\$} R$$

and $t \leftarrow as_1 + s_2$. The public key is $pk = (a, t, p, q)$, where $p$ is the same value as the modulus that the linear relation is being proved over. The secret key is $sk = s_1$.

Encryption and verification. The prover encrypts a witness $w = m$ for language member $x = (B, u)$ satisfying (9) with randomness $$(r, e, e') \xleftarrow{\$} S_1^{3k}$$

as in (7). The prover then concatenates this with (9) to form the relation below:

$$\begin{bmatrix} paI_k & pI_k & 0^{k \times k} & 0^{k \times k} \\ ptI_k & 0^{k \times k} & pI_k & I_k \\ 0^{\ell \times k} & 0^{\ell \times k} & 0^{\ell \times k} & B \end{bmatrix} \begin{bmatrix} r \\ e \\ e' \\ m \end{bmatrix} = \begin{bmatrix} v \\ w \\ u \end{bmatrix} \begin{matrix} \mod q \\ \mod q \\ \mod p \end{matrix} \quad (11)$$

As discussed, there is no practical proof of knowledge for the above relation, and so the prover instead uses the "Fiat-Shamir with Aborts" approach shown in FIG. 1 to construct a proof of knowledge $\pi$ of low-weight $\bar{r}, \bar{e}, \bar{e}', \bar{m}$, and $\bar{c}$ that satisfy $$\begin{bmatrix} paI_k & pI_k & 0^{k \times k} & 0^{k \times k} \\ ptI_k & 0^{k \times k} & pI_k & I_k \\ 0^{\ell \times k} & 0^{\ell \times k} & 0^{\ell \times k} & B \end{bmatrix} \begin{bmatrix} \bar{r} \\ \bar{e} \\ \bar{e}' \\ \bar{m} \end{bmatrix} = \bar{c} \begin{bmatrix} v \\ w \\ u \end{bmatrix} \begin{matrix} \mod q \\ \mod q \\ \mod p \end{matrix} \quad (12)$$

This procedure and the corresponding verification are shown in FIGS. 3 and 4.

An exemplary process 300 for verifiable encryption is shown in FIG. 3. Process 300 accepts as input 302 public key $pk = (a, t, p, q)$, language member $x = (B, u)$, witness $w = m \in S_\gamma^k$, a challenge domain $\mathcal{C} = \{c \in R: \|c\|_\infty = 1, \|c\|_1 \leq 36\}$, a cryptographic hash function $H: \{0,1\}^* \to \mathcal{C}$, and a standard deviation $$\sigma = 11 \cdot \max_{c \in C} \|c\|_1 \cdot \sqrt{kn(3+\gamma)}.$$

Process 300 begins with step 304, in which $$r, e, e' \xleftarrow{\$} S_1^k.$$

At step 306, $$\begin{bmatrix} v \\ w \end{bmatrix} \leftarrow \begin{bmatrix} paI_k & pI_k & 0^{k \times k} & 0^{k \times k} \\ ptI_k & 0^{k \times k} & pI_k & I_k \end{bmatrix} \begin{bmatrix} r \\ e \\ e' \\ m \end{bmatrix} \begin{matrix} \mod q \\ \mod q \end{matrix}.$$

At step 308, $$y \leftarrow \begin{bmatrix} y_r \\ y_e \\ y_{e'} \\ y_m \end{bmatrix} \xleftarrow{\$} D_{R^{4k}, 0, \sigma}.$$

At step 310, $$c \leftarrow H \left( \begin{bmatrix} paI_k & pI_k & 0^{k \times k} & 0^{k \times k} \\ ptI_k & 0^{k \times k} & pI_k & I_k \\ 0^{\ell \times k} & 0^{\ell \times k} & 0^{\ell \times k} & B \end{bmatrix}, \begin{bmatrix} v \\ w \\ u \end{bmatrix}, \begin{bmatrix} paI_k & pI_k & 0^{k \times k} & 0^{k \times k} \\ ptI_k & 0^{k \times k} & pI_k & I_k \\ 0^{\ell \times k} & 0^{\ell \times k} & 0^{\ell \times k} & B \end{bmatrix} \begin{bmatrix} y_r \\ y_e \\ y_{e'} \\ y_m \end{bmatrix} \begin{matrix} \mod q \\ \mod q \\ \mod p \end{matrix} \right).$$

At step 312, $$s \leftarrow \begin{bmatrix} r \\ e \\ e' \\ m \end{bmatrix} c.$$

At step 314, $z \leftarrow s + y$. At step 316, with probability $$\frac{D_{R^{4k}, 0, \sigma}(z)}{3 \cdot D_{R^{4k}, s, \sigma}(z)},$$

continue, else goto 308. At step 318, if $\|z\|_\infty >_6 \cdot \sigma$, goto 308. At step 320, RETURN $t = (v, w, c, z)$.

An exemplary process 400 for verification of the verifiable encryption shown in FIG. 3 is shown in FIG. 4. Process 400 accepts as input 402 Public key $pk = (a, t, p, q)$, language member $x = (B, u)$, ciphertext $t = (v, w, c, z)$, cryptographic hash function H, and positive real $\sigma$ as in FIG. 3. Process 400 begins with step 404, in which it is determined whether $\|z\|_\infty > 6 \cdot \sigma$, If so, then return 0, which indicates that the verification failed. At step 406, it is determined if $$c \ne H\left( \begin{bmatrix} pal_k & pI_k & 0^{k \times k} & 0^{k \times k} \\ ptl_k & 0^{k \times k} & pI_k & I_k \\ 0^{l \times k} & 0^{l \times k} & 0^{l \times k} & B \end{bmatrix} \right),$$

$$\left( \begin{bmatrix} v \\ w \\ u \end{bmatrix}, \begin{bmatrix} pal_k & pI_k & 0^{k \times k} & 0^{k \times k} \\ ptl_k & 0^{k \times k} & pI_k & I_k \\ 0^{l \times k} & 0^{l \times k} & 0^{l \times k} & B \end{bmatrix} z - c \begin{bmatrix} v \\ w \\ u \end{bmatrix} \begin{matrix} \bmod q \\ \bmod q \\ \bmod p \end{matrix} \right).$$

If so, then return 0, which indicates that the verification failed. At step 408, process 400 may return 1, which indicates that the verification succeeded.

Decryption. When given the ciphertext t=(v, w, c, z), the decryptor can recover some $(\overline{m}, \overline{c})$ that satisfies (10). Because the proof of knowledge (c, z) does not imply that $$\begin{bmatrix} v \\ w \end{bmatrix}$$

is a valid Ring-LWE ciphertext, the Ring-LWE decryption algorithm from (4) cannot simply be used.

Instead, a value for $\overline{c}$ may be guessed and then decryption of the ciphertext $$\overline{c} \begin{bmatrix} v \\ w \end{bmatrix} \bmod q$$

may be attempted in hopes of recovering $\overline{m}$. The problem with this straight-forward approach is that the decryption algorithm will always return something, and a way is needed to decide whether this decryption is something valid or just garbage. In Lemma 3 is is shown that if the parameters of the Ring-LWE encryption scheme are set in a particular way, then the decryptor can test whether a particular ciphertext $$\overline{c} \begin{bmatrix} v \\ w \end{bmatrix} \bmod q$$

is "valid", and for any $\overline{c}$ and $\overline{c}'$ that lead to valid ciphertexts decrypting to $\overline{m}$ and $\overline{m}'$, respectively, there is the equality $$\overline{m}/\overline{c} = \overline{m}'/\overline{c}' \bmod p \quad (13)$$

The implication of the above equation is that once the decryptor decrypts some pair $(\overline{m}', \overline{c}')$, it is a valid solution to (10). This is because the proof of knowledge π proves knowledge of some $(\overline{m}, \overline{c})$ that satisfies $B\overline{m}=\overline{c}u \bmod p$, or equivalently $B\overline{m}/\overline{c}=u \bmod p$. Equation (13) then implies that $$B\overline{m}'=\overline{c}'u \bmod p.$$

Another issue is how to find a valid $\overline{c}$. In particular, if the proof of knowledge is to be "one-shot", then the challenge space should be exponentially large, and so it is impractical to simply try all the possible $\overline{c}$ (of which there are actually even more than in the challenge space). As shown in Lemma 4, the decryptor may try random $\overline{c}$ (there is some relation between π and which $\overline{c}$ should be tried), and then the expected number of tries is essentially the number of random oracle queries that the prover makes when constructing π, where the probability is taken over the randomness of the random oracle (modeled as a random function) and the coins of the decryptor. FIG. 5 illustrates the decryption algorithm that guesses a random c' from $\mathcal{C}$, constructs $\overline{c}=c-c'$, where c is part of the proof π, and then checks whether $$\overline{c} \begin{bmatrix} v \\ w \end{bmatrix} \bmod q$$

is a valid ciphertext (actually k valid ciphertexts because the plaintext m is encrypted as k independent plaintexts). If it is, then it decrypts it, and otherwise it guesses a new random c'.

An exemplary process 500 of decryption is shown in FIG. 5. Process 500 accepts as input 502 Secret key sk=$s_1$; language member x=(B, u), and ciphertext t=(v, w, c, z). Process 500 begins with step 504, in which it is determined whether V(pk, x, t)-1 the following loop is executed. At step 506, the loop begins. At step 508, $$c' \xleftarrow{\$} \mathcal{C}.$$

At step 510, $\overline{c} \leftarrow c-c'$. At step 512, $\overline{m} \leftarrow (w-vs_1)\overline{c} \bmod q$. At step 514, it is determined whether $\|\overline{m}\|_\infty < q/2C$. At step 516, $\overline{m} \leftarrow \overline{m} \bmod p$. At step 518, process 50 may return $(m, \overline{c})$. At steps 520, 522, 524, the if-then statements and loop are ended.

$$\begin{bmatrix} v \\ w \end{bmatrix}$$

If the prover is honest, then will already be a valid ciphertext, and then it's not hard to see that any $\overline{c}$ will result in a valid decryption (or the decryptor can try $\overline{c}=1$ first). On the other hand, if the prover can only query the random oracle a few times, then the decryptor will also expect to recover a solution to (10) within a few queries (see Lemma 4). Making decryption time dependent on the number of random-oracle queries in the proof may be a novel and advantageous feature. In many embodiments of verifiable encryption, ciphertext proofs may be constructed in an interactive protocol. The verifier may therefore specify a fresh random oracle (by sending a new salt for SHA-256, for example), preventing a dishonest prover from pre-computing a dishonest response off-line. Furthermore, the verifier can time-out if the prover did not produce a proof within a specified amount of time, thus limiting the number of times the latter can query the random oracle. Thus, in many embodiments, the decryptor will have more time to decrypt than the prover has to come up with a proof.

Proofs of Plaintext Knowledge. Proofs of plaintext knowledge may be seen as a verifiable encryption scheme without a relation, or where the relation is trivially satisfied. For example, the scheme discussed above may be considered with B and u being 0, or simply the row(s) containing B and u not being present in relation (11).

The soundness requirement that a valid ciphertext must decrypt to a valid witness makes no sense if the relation is trivial. Instead, soundness for a proof of plaintext knowledge requires that decryption returns the same value as can be extracted from the proof of knowledge. The randomized decryption algorithm as shown in FIG. 5 does not satisfy such a requirement, as it potentially returns a different pair $(\overline{m}, \overline{c})$ at each execution. However, because of the property that $\overline{m}/\overline{c} = \overline{m}'/\overline{c}'$ mod p for any $(\overline{m}, \overline{c})$, $(\overline{m}', \overline{c}')$ returned by the decryption algorithm, the decryption may be made deterministic by letting it return $\overline{m}/\overline{c}$ mod p. Because this unique value can also be extracted from the proof, this turns the verifiable encryption scheme into a proof of plaintext knowledge.

Soundness. The soundness property of the relaxed verifiable encryption scheme may be shown by showing that decryption of a valid ciphertext, if it finishes, yields a witness from $R_L$. Further, it is shown that the expected running time of the decryption algorithm is proportional to the number of random-oracle queries made by the adversary who created the ciphertext.

If an adversary A, who is trying to break the soundness of the scheme, outputs a ciphertext t=(u, v, c, z) that is valid for x=(B, u), then by the verification procedure shown in FIG. 4, it is the case that $\|z\|_\infty >\!\!> 6\cdot\sigma$ and $$c = H\left(\begin{bmatrix} pa I_k & p I_k & 0^{k\times k} & 0^{k\times k} \\ pt I_k & 0^{k\times k} & p I_k & I_k \\ 0^{l\times k} & 0^{l\times k} & 0^{l\times k} & B \end{bmatrix},\right.$$

$$\left.\begin{bmatrix} v \\ w \\ u \end{bmatrix}, \begin{bmatrix} pa I_k & p I_k & 0^{k\times k} & 0^{k\times k} \\ pt I_k & 0^{k\times k} & p I_k & I_k \\ 0^{l\times k} & 0^{l\times k} & 0^{l\times k} & B \end{bmatrix} z - c \begin{bmatrix} v \\ w \\ u \end{bmatrix} \begin{matrix} \bmod q \\ \bmod q \\ \bmod p \end{matrix}\right).$$

Let A denote the first argument of the above random-oracle query and y the last, thus, the above equation may be rewritten as c=H(A, [v; w; u], y).

With overwhelming probability, there exists a second challenge $c' \in \mathcal{C} \setminus \{c\}$ for which there exists a vector z' with $\|z'\|_\infty \geq 6\cdot\sigma$ and y=Az'−c'[v; w; u]. Indeed, if c were the only such challenge, then at the moment of making the above random-oracle query, A would have had probability $1/\mathcal{C}$ of hitting the only challenge c for which a valid proof exists. The probability that A outputs a proof for which only one such challenge c exists is therefore at most $q_H/\mathcal{C}$.

So with overwhelming such c', z' does exist, and we have that y=Az−c[v; w; u]=Az'−c'[v; w; u] with $\|z\|_\infty \geq 6\cdot\sigma$ and $\|z'\|_\infty \geq 6\cdot\sigma$. Hence, letting $\overline{c} = c - c'$ and $\overline{z} = z' - z = [\overline{r}; \overline{e}; \overline{e}'; \overline{m}]$, then $A\overline{z} = \overline{c}[v; w; u]$ with $\|\overline{z}\|_\infty \geq 12\cdot\sigma$.

By choosing the scheme parameters appropriately, for example, such that $(36p+12)\sigma < q/2C$, the preconditions of Lemma 3, shown below, may be satisfied. These preconditions show that for any $(\overline{m}', \overline{c}')$ returned by the decryption algorithm, then $\overline{m}'/\overline{c}' = \overline{m}/\overline{c}$, and, because $B\overline{m} = \overline{c}u$, then $B\overline{m}' = \overline{c}'u$.

Lemma 3 Let (a, t, p, q) and $(s_1, s_2)$ be generated keys as in the construction section above. If for given v, w∈$R_q$ there exist $\overline{r}, \overline{e}, \overline{e}', \overline{m}, \overline{c}$ such that $$\begin{bmatrix} pa\,|\,p\,|\,0\,|\,0 \\ pt\,|\,0\,|\,p\,|\,1 \end{bmatrix} \begin{bmatrix} \overline{r} \\ \overline{e} \\ \overline{e}' \\ \overline{m} \end{bmatrix} = \overline{c}\begin{bmatrix} v \\ w \end{bmatrix} \bmod q \quad (14)$$

and $$\|p(\overline{r}s_2 + \overline{e}' - \overline{e}s_1) + \overline{m}\|_\infty < q/2C$$

where $C = \max_{\overline{c}\in\overline{\mathcal{C}}} \|\overline{c}\|_1 = \max_{c,c'\in\mathcal{C}} \|c - c'\|_1$, then 1. $\|(w - vs_1)\overline{c} \bmod q\|_\infty < q/2C$
2. For any $\overline{c}' \in \overline{\mathcal{C}}$ for which $\|(w - vs_1)\overline{c}' \bmod q\|_\infty < q/2C$, $$(w - vs_1)\overline{c}' \bmod q/\overline{c}' \bmod p = \overline{m}/\overline{c} \bmod p.$$

Proof: To prove the first part, it is noted that by the definition of Ring-LWE decryption, $$(w - vs_1)\overline{c} \bmod q = p(\overline{r}s_2 + \overline{e}' - \overline{e}s_1) + \overline{m}.$$

which has $\ell_\infty$ length less than $$\frac{q}{2C}$$

by the hypothesis of the lemma.

To prove the second part, it is first noted that $$(w - vs_1)\overline{c}\overline{c}' \bmod q \bmod p = \qquad (15)$$
$$(p(\overline{r}s_2 + \overline{e}' - \overline{e}s_1) + \overline{m})\overline{c}' \bmod q \bmod p = \overline{m}\overline{c}' \bmod p.$$

Then $$(w - vs_1)\overline{c}' \bmod q/\overline{c}' \bmod p = (w - vs_1)\overline{c}' \bmod q \cdot \overline{c}/(\overline{c}\overline{c}') \bmod p \qquad (16)$$

$$= (w - vs_1)\overline{c}\overline{c}' \bmod q/(\overline{c}\overline{c}') \bmod p \qquad (17)$$

$$= \overline{m}\overline{c}'/(\overline{c}\overline{c}') \bmod p = \overline{m}/\overline{c} \bmod p \qquad (18)$$

The first equality is an identity, the second equality holds because $$\|(w - vs_1)\overline{c}' \bmod q\|_\infty < \frac{q}{2C}$$

and therefore multiplication by $\overline{c}$ does not cause a reduction modulo q. The third equality follows from (15).

By checking that $\|(w-vs_1)\overline{c} \bmod q\|_\infty < q/2C$ in 514 of FIG. 5, we ensure that the condition of the second part of Lemma 3 is satisfied for decryption, so that the value $(\overline{m}'(w-vs_1)\overline{c}' \bmod q \bmod p, \overline{c}')$ is indeed a witness for $(B, u) \in \overline{L}$. This proves the soundness of our scheme.

Correctness. Correctness is straightforward because a valid encryption (see (5)) satisfies the preconditions of Lemma 3 with $[\overline{r}; \overline{e}; \overline{e}'; \overline{m}] = [r; e; e'; m]$ and $\overline{c} = 1$; and it's clear that $\|p(rs_2 + e' - es_1) + m\|_\infty \leq \|p(\overline{r}s_2 + \overline{e}' - \overline{e}s_1) + \overline{m}\|_\infty$.

Completeness. Completeness follows from the completeness of the proof system regarding FIGS. 1 and 2.

Simulatability. The simulator Sim creates a Ring-LWE encryption [v; w] of m=1 using the Ring-LWE Encryption Scheme described above, and runs the zero-knowledge simulator for the proof system regarding FIGS. 1 and 2 to create a valid-looking proof (c, z) for (B, u). The indistinguishability from the real proof follows from the IND-CPA security of Ring-LWE encryption and the zero-knowledge property of the proof system.

Decryption Running Time: Even though the running time of the decryption algorithm is unbounded in principle, we show that the expected running time of the decryption algorithm is at most twice the time it took an adversary to generate the ciphertext. More precisely, we prove the following lemma.

Lemma 4 Consider the following experiment with an adversary making at most $q_H$ random-oracle queries:

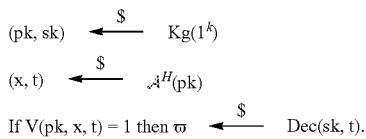

Let T be number of loop iterations in the execution of Dec (see FIG. 5, steps 506-522) until it produces its output $\overline{w}$. Then for any $f \in [0,1]$, with probability at least $1 - fq_H/|\mathcal{C}|$ we have that $$\mathrm{Exp}[T] \leq \left(1 + \frac{1}{f}\right) q_H.$$

As a consequence of Markov's inequality, we have that $$\Pr[T > \alpha \cdot q_H] \leq \left(1 + \frac{1}{f}\right)\frac{1}{\alpha} + \frac{f q_H}{|\mathcal{C}|}.$$

Proof: First, it may be observed that, regarding the expected running time of Dec(sk, t), for a given ciphertext $t = (v, w, c, z)$, consider the zero-knowledge proof $(y, c, z)$ where $y = Az - c[v; w; u]$ where A is the matrix on the left in (11). Let $\mathcal{G}_t$ be the set of "good" challenges $c'$ for which a valid zero-knowledge proof $(y, c', z')$ exists, i.e., $\mathcal{G} = \{c' \in \mathcal{C} : \exists z' := Az' - c'[v; w; u]$ and $\|z'\|_\infty \geq 6 \cdot \sigma\}$, and let $\in_t = |\mathcal{G}_t|/|\mathcal{C}|$.

The decryption algorithm essentially keeps trying random challenges $$c' \xleftarrow{\$} \mathcal{C}$$

until it hits a good challenge $c' \in \mathcal{G}_t \setminus \{c\}$, so the expected number of iterations that Dec(sk, t) has to go through until it finds such a challenge is $$\frac{1}{\in_t - \frac{1}{|\mathcal{C}|}}.$$

An upper bound may therefore be obtained for the expected running time of Dec by obtaining a lower bound for $\in_t$ for the ciphertext t that the adversary $\mathcal{A}$ can output using at most $q_H$ random-oracle queries.

Second, as already observed in the proof of soundness relating to correctness and security, described above, the adversary $\mathcal{A}$ has negligible probability to produce a ciphertext t with only one good challenge, i.e., $|\mathcal{G}_t| = 1$ and $\in_t = 1/|\mathcal{C}|$. This is important because, if the adversary were able to do so, there is only one "good" challenge in $\mathcal{G}_t$, namely c itself, so that the decryption algorithm will continue looping forever. In order to produce such a ciphertext and proof, the adversary has to make a random-oracle query $H(pk, v, w, y)$ that yields c. Since the argument of the query fixes t and y, and hence $\mathcal{G}_t = \{c\}$, the probability that the random output hits c is $1/|\mathcal{C}|$, so that the probability of doing so in any of $\mathcal{A}$'s $q_H$ random-oracle queries is at most $q_H/|\mathcal{C}|$. By the same argument, the adversary has probability at most $q_H/|\mathcal{C}|$ to output a ciphertext and valid proof with $\in_t \leq f/|\mathcal{C}|$.

The lemma may now be proved by induction on the number of $\mathcal{A}$'s random-oracle queries. To maximize the expected number of iterations during decryption, $\mathcal{A}$ must make a random-oracle query $H(A, [v; w; u], y)$ so that its output is in $\mathcal{G}_t$ while keeping $|\mathcal{G}_t|$ as low as possible. At any point in $\mathcal{A}$'s execution, let $T_{q,B}$ be the highest expected number of iterations that $\mathcal{A}$ can make Dec perform given that $\mathcal{A}$ still has q of its $q_H$ random-oracle queries remaining and B is the best (i.e., highest) expected number of loop iterations so far that, based on $\mathcal{A}$'s random-oracle queries, it can cause during encryption. It is clear that $$\mathrm{Exp}[T] \leq T_{q_H, 0}.$$

We will show that, with probability at least $1 - fq_H/\mathcal{C}$, $$T_{q,B} \leq \left(1 + \frac{1}{f}\right)q + B, \qquad (19)$$

from which the lemma easily follows.

The inequality (19) may likewise be proved by induction on q. It is clear that it holds for $q = 0$ because $T_{0,B} = B$. Assume that it holds for $q - 1$, i.e., $$T_{q-1,B} \leq \left(1 + \frac{1}{f}\right)(q-1) + B. \qquad (19)$$

Then at the moment that $\mathcal{A}$ makes its q-to-last random-oracle query $H(A, [v; w; u], y)$, the random-oracle response will be in $\mathcal{G}_t$ with probability $\in = \mathcal{G}_t \setminus |\mathcal{C}|$. If the response is in $\mathcal{G}_t$, then $\mathcal{A}$ can increase the expected number of iterations during decryption to $$\frac{1}{\in - 1/|\mathcal{C}|};$$

if not, it can always still output its best ciphertext so far taking B iterations to decrypt. (We're being generous here and assume that $\mathcal{A}$ can actually compute a valid response z to complete the proof of plaintext knowledge.) Also note that it doesn't make sense for $\mathcal{A}$ to make queries with $$\frac{1}{\in - 1/|\mathcal{C}|} \leq B,$$

because $\mathcal{A}$ can already output a ciphertext with B expected decryption iterations.) Thus, $$T_{q,B} = \in \cdot T_{q-1, \frac{1}{\in - 1/|\mathcal{C}|}} + (1 - \in) \cdot T_{q-1, B} \leq \qquad (20)$$

-continued $$\epsilon \cdot \left(\left(1+\frac{1}{f}\right)(q-)+\frac{1}{\epsilon-\frac{1}{|\mathcal{C}|}}\right)+(1-\epsilon)\cdot\left(\left(1+\frac{1}{f}\right)(q-1)+B\right) \le$$

$$\left(1+\frac{1}{f}\right)(q-1)+\frac{\epsilon}{\epsilon-\frac{1}{|\mathcal{C}|}}+B$$

As argued earlier, there is that $\epsilon \ge (f+1)/\mathcal{C}$ with probability at least $1-\mathrm{fq}_H/\mathcal{C}$, Since $$\frac{\epsilon}{\delta - 1/\mathcal{C}}$$

is monotonically decreasing over the interval $e \in (1/\mathcal{C}, 1]$, with probability at least $1-\mathrm{fq}_H/\mathcal{C}$ we have that $$\frac{\epsilon}{\epsilon-\frac{1}{|\mathcal{C}|}} \le \frac{f+1}{f} = 1+\frac{1}{f}.$$

Combining this with inequality (20) easily yields inequality (19).

Chosen-Ciphertext Security Many applications require a verifiable ciphertext to hide the encrypted witness, even when the adversary has access to decryptions of other ciphertexts. As a natural analog of indistinguishability under chosen-ciphertext attack (IND-CCA) for standard public-key encryption schemes, a chosen-ciphertext simulatability may be defined and and an example constructed as described below.

For example, the sender may encrypt the message twice under different public keys and adds a non-interactive zero-knowledge (NIZK) proof that both ciphertexts encrypt the same message. If the NIZK proof is simulation-sound, then the resulting encryption scheme is secure against adaptive chosen-ciphertext (CCA2) attacks. It has also been shown that Fiat-Shamir proofs are simulation-sound in the random-oracle model if the underlying proof system has quasi-unique responses.

Furthermore, because the verifiable encryption scheme for a CPA-secure encryption scheme already includes a NIZK, this conversion from CPA to CCA2 security is rather cheap, increasing the size of the proof and ciphertext by factors less than 2 (see (21)).

Chosen-Ciphertext Simulatability. A relaxed verifiable encryption scheme (Kg, Enc, V, Dec) may be deemed chosen-ciphertext simulatable when there exists a simulator Sim such that the following probability is negligible for all PPT adversaries A:

$$\left| Pr\left[ b' = b: \begin{array}{c} b \xleftarrow{\$} \{0,1\}, (pk, sk) \xleftarrow{\$} Kg(1^k), (st, x, w) \xleftarrow{\$} A(pk), \\ t_0 \xleftarrow{\$} Enc(pk, x, w), t_1 \xleftarrow{\$} Sim(pk, x), b' \xleftarrow{\$} A^{Dec(sk,\cdot)}(st, t_b) \end{array} \right] - \frac{1}{2} \right|,$$

where A is not allowed to query its Dec oracle on the challenge ciphertext

Construction. The receiver may generate a Ring-LWE key pair by choosing $$s_1, s_2 \xleftarrow{\$} S_1 \text{ and } a \xleftarrow{\$} R,$$

and computing $t_1 \leftarrow as_1+s_2$. He also chooses $$t_2 \xleftarrow{\$} R.$$

The public key may be $pk=(a, t_1, t_2, p, q)$, where p is modulus for proving the linear relation. The secret key may be $sk=s_1$.

The sender may encrypt a witness $w=m$ for language member $x=(B, u)$ by choosing randomness $$(r_1, e_1, e'_1, r_2, e_2, e'_2) \xleftarrow{\$} S_1^{6k},$$

computing $$\begin{bmatrix} pa I_k & p I_k & 0^{k\times k} & 0^{k\times k} & 0^{k\times k} & 0^{k\times k} & 0^{k\times k} \\ pt_1 I_k & 0^{k\times k} & p I_k & 0^{k\times k} & 0^{k\times k} & 0^{k\times k} & I_k \\ 0^{k\times k} & 0^{k\times k} & 0^{k\times k} & pa I_k & p I_k & 0^{k\times k} & 0^{k\times k} \\ 0^{k\times k} & 0^{k\times k} & 0^{k\times k} & pt_2 I_k & 0^{k\times k} & p I_k & I_k \end{bmatrix} \begin{bmatrix} r_1 \\ e_1 \\ e'_1 \\ r_2 \\ e_2 \\ e'_2 \\ m \end{bmatrix} = \begin{bmatrix} v_1 \\ w_1 \\ v_2 \\ w_2 \end{bmatrix} \begin{array}{l} \bmod q \\ \bmod q \\ \bmod q \\ \bmod q \end{array} \quad (21)$$

and concatenating a proof (c, z) for the relation:

$$\begin{bmatrix} pa I_k & p I_k & 0^{k\times k} & 0^{k\times k} & 0^{k\times k} & 0^{k\times k} & 0^{k\times k} \\ pt_1 I_k & 0^{k\times k} & p I_k & 0^{k\times k} & 0^{k\times k} & 0^{k\times k} & I_k \\ 0^{k\times k} & 0^{k\times k} & 0^{k\times k} & pa I_k & p I_k & 0^{k\times k} & 0^{k\times k} \\ 0^{k\times k} & 0^{k\times k} & 0^{k\times k} & pt_2 I_k & 0^{k\times k} & p I_k & I_k \\ 0^{l\times k} & 0^{l\times k} & 0^{l\times k} & 0^{l\times k} & 0^{l\times k} & 0^{l\times k} & B \end{bmatrix} \begin{bmatrix} r_1 \\ e_1 \\ e'_1 \\ r_2 \\ e_2 \\ e'_2 \\ m \end{bmatrix} = \begin{bmatrix} v_1 \\ w_1 \\ v_2 \\ w_2 \\ n \end{bmatrix} \begin{array}{l} \bmod q \\ \bmod q \\ \bmod q \\ \bmod q \\ \bmod p \end{array}. \quad (22)$$

Verification of a ciphertext $(v_1, w_1, v_2, w_2, c, z)$ may be done by verifying the zero-knowledge proof (c, z) for the relation (22). Decryption works as shown in FIG. 5, using $w_1$ instead of w.

Security. Correctness, completeness, and soundness all hold under the same assumptions as the CPA-secure scheme relating to correctness and security described above. Chosen-ciphertext simulatability is satisfied by a simulator Sim that replaces $(v_1, w_1)$ and $(v_2, w_2)$ in the challenge ciphertext with random Ring-LWE encryptions of $1^k$ under $t_1$ and $t_2$, respectively, and simulates (c,z) through the zero-knowledge simulator for the proof system relating to correctness and security described above. To see why this is indistinguishable from a real ciphertext, consider the following game hops:

Game 0: This is the normal simulatability game with b=0, i.e., where the adversary is always given the real ciphertext $t_0$ as challenge ciphertext $t^*$.

Game 1: The zero-knowledge proof (c, z) in the challenge ciphertext t* is replaced with a simulated proof. Indistinguishability from the previous game is guaranteed by the honest-verifier zero-knowledge property of the proof system relating to Fiat-Shamir with Aborts Proofs of Knowledge of Linear Relations described above.

Game 2: The components $v_1$, $w_2$ in t* are chosen as random Ring-LWE encryptions of $1^k$ under $t_2$, instead of being computed as in (21). This game is indistinguishable from Game 1 under the IND-CPA security of the Ring-LWE encryption scheme described above, Game 3: This game aborts whenever A submits a valid but malformed ciphertext $t=(v_1, w_1, v_2, w_2, c, z)$ and language member x=(B, u) to its decryption oracle, i.e., such that V(pk, t, x)=1 but there do not exist c, z such that $A\bar{z}=\bar{c}[v_1; w_1; v_2; w_2; u]$. Indistinguishability from the previous game follows from the simulation-soundness of the proof system relating to Fiat-Shamir with Aborts Proofs of Knowledge of Linear Relations described above. (Note that normal soundness does not suffice, as the adversary is given a simulated proof for a false statement as part of its manipulated challenge ciphertext t*,)

Game 4: Instead of choosing $$t_1 \;=\; as_1 \;+\; s_2 \quad \text{and} \quad t_2 \;\xleftarrow{\$}\; R,$$

the challenger now sets $t_2=as_1+s_2$ and chooses $$t_1 \;\xleftarrow{\$}\; R.$$

Decryption queries are now answered using $w_2$ instead of $w_1$. The result of decryption is identically distributed as when $w_1$ is used, because Game 3 ensures that both ciphertexts encrypt the same witness.

Game 5: Now the components $v_1$, $w_1$ in the challenge ciphertext t* are also chosen as random encryptions of k. Similarly to the hop in Game 2, indistinguishability holds under the IND-CPA security of the Ring-LWE encryption scheme described above. Note that the reduction from Ring-LWE can only go through because decryption queries are answered using a trapdoor behind $t_2$, not $t_1$.

Game 6: Finally, revert the changes of Game 3 and Game 4, i.e., let $t_1=as_1+s_2$ and answer decryption queries using the normal decryption algorithm. Indistinguishability holds because of the same reasons as in Game 3 and Game 4. Note that this game is exactly the chosen-ciphertext simulatability experiment for the case that A is given a simulated ciphertext (b=1). By the indistinguishability of the consecutive game hops, we have proved that A cannot distinguish it from a real ciphertext.

Applications

Key Escrow for Ring-LWE Encryption. For example, a verifiable escrow scheme for decryption keys may allow a key owner to encrypt his private decryption key under the public key of a trusted authority so that anyone can check that the ciphertext is indeed an encryption of the private key corresponding to the owner's public key, but only the trusted authority can actually recover the private key. Intuitively, the owner is giving a proof that all messages sent to his public key can also be decrypted by the trusted third party. Note that a key escrow scheme cannot prevent parties from communicating securely, because even when forced to use escrowed keys, the parties can choose to double-encrypt messages under a non-escrowed key, or apply steganography to hide the fact that they are communicating altogether. The goal, therefore, is rather to prevent "dishonest" usage of public-key infrastructures, for example, to certify non-escrowed keys.

Embodiments of the present methods and systems may be used to verifiably escrow Ring-LWE decryption keys. While, due to the relaxation of verifiable encryption, it cannot be guaranteed that the trusted authority recovers the actual decryption key, it can be shown that whatever the trusted authority recovers suffices to decrypt messages encrypted under the corresponding public key.

For example, let the trusted authority have a Ring-LWE public key $t=as_1+s_2 \mod q$ as described in relation to the Ring-LWE encryption scheme described above. Users may also have Ring-LWE encryption keys, but in $R_p$ instead of $R_q$. Meaning, a secret key is a pair $$(m_1, m_2) \;\xleftarrow{\$}\; S_1^2,$$

while the public key is $$u \;=\; bm_1 \;+\; m_2 \mod p \quad \text{for} \quad b \;\xleftarrow{\$}\; R_p$$

together with a prime p'<p. Encryption and decryption may work as in regular Ring-LWE, i.e., the sender chooses $$r, e, e' \;\xleftarrow{\$}\; S_1$$

and computes $$v=p'(br+e) \mod p$$

$$w=p'(ur+e')+\mu \mod p. \tag{23}$$

To decrypt, the receiver may compute $\mu \leftarrow -vs_1 \mod p \mod p'$.

To escrow a decryption key, the key owner may create a verifiable encryption of the secret key $m=[m_1; m_2]$ using embodiments of the present methods and systems, such as those shown in the construction section above, under the authority's public t with a proof that m is a witness for the relation $$[b \; 1]\begin{bmatrix} m_1 \\ m_2 \end{bmatrix} = u \mod p.$$

The soundness property of embodiments of the relaxed verifiable encryption scheme guarantees that the authority can decrypt a witness $(\bar{m}, \bar{c})$ such that $$b\bar{m}_1+\bar{m}_2=\bar{c}u \mod p.$$

The authority can decrypt an honestly generated ciphertext of the form (23) by computing $$\bar{c}w - v\bar{m}_1 \bmod p = \bar{c}p'(ur+e') + \bar{c}\mu - p'(br+e)\bar{m}_1 \bmod p$$

$$= p'((b\bar{m}_1 + \bar{m}_2)r + \bar{c}e') + \bar{c}\mu - p'(b\bar{m}_1 r + e\bar{m}_1) \bmod p$$

$$= p'(\bar{m}_2 r + \bar{c}e' - e\bar{m}_1) + \bar{c}\mu \bmod p$$

from which μ can be recovered by reducing modulo p' and then dividing by c modulo p' (note that it is important that p' is chosen such that all differences of challenges in the challenge space are invertible), as long as the parameters are chosen such that $\|p'(\bar{m}_2 r + \bar{c}e' - e\bar{m}_1) + \bar{c}\mu\|_\infty < p/2$.

Verifiably Encrypted Signatures. As another example, suppose two parties want to engage in a contract together and exchange signatures on the agreed contract. Neither of the parties wants to be the first to send his signature, however, fearing that the other party may not reciprocate and may hold the first party liable to the conditions in the contract, without being held liable himself. Fair signature exchange protocols may ensure that no party can obtain a significant advantage over the other party by aborting the protocol early.

Verifiably encrypted signatures may be a useful tool to build optimistic fair exchange protocols. The first party initially sends their signature encrypted under the key of a trusted adjudicator such that the other party can verify that the ciphertext indeed contains a valid signature on the agreed contract, but cannot recover the signature itself. The second party responds by sending their signature, after which the first party also sends over the first party's signature. In case the first party refuses to send their signature in the last step, the second party can contact the adjudicator to have the encrypted signature from the first party decrypted.

Embodiments of a relaxed verifiable encryption scheme may be used to build verifiably encrypted signatures for the ring-based variant of Gentry-Peikert-Vaikuntanathan (Ring-GPV) signature scheme based on the hardness of the Ring-SIS or NTRU problems. Here, the signer's public key is a polynomial $b \in R_p$, while the secret key is a trapdoor allowing to find, for a given $n \in R_p$, short polynomials $m_1, m_2$ such that $bm_1 + m_2 = u$. A signature on a message μ in the usual scheme is a short vector $(m_1, m_2)$ such that $bm_1 + m_2 = H(\mu)$ mod p, where $H: \{0,1\}^* \to R_p$ is a random oracle. It is easy to show, however, that the scheme remains secure if the verification algorithm is relaxed to accept any tuple of short polynomials $(m_1, m_2, c)$ such that $bm_1 + m_2 = cH(\mu)$ mod p.

In the usual security proof, when the adversary produces a forgery, $bm_1 + m_2 = H(\mu)$ mod p, the simulator already possesses another equality $bm'_1 + m'_2 = H(\mu)$ mod p, and thus obtains a solution to Ring-SIS as $b(m_1 + m'_1) + (m_2 + m'_2) = 0$ mod p. If, on the other hand, the adversary produces a forgery $bm_1 + m_2 = cH(\mu)$ mod p, then the simulator may obtain the equation $b(cm_1 - m'_1) + (cm_2 - m'_2) = 0$ mod p, which is still a (slightly longer) solution to Ring-SIS.

For example, a modified signature scheme may be used to build a verifiably encrypted signature scheme using embodiments of a CCA-secure relaxed verifiable encryption scheme relating to Chosen-Ciphertext Security described above. Namely, to encrypt an honest signature $(m_1, m_2, 1)$ under the adjudicator's public key, one encrypts the witness $m=[m_1; m_2]$ with the encryption scheme relating to Chosen-Ciphertext Security described above while proving that $[b\ 1]m=H(\mu)$ mod p. When the adjudicator decrypts the signature, it recovers (m, c) such that $[b\ 1]m=\bar{c}H(\mu)$ mod p, which is also a valid signature on μ. Unforgeability follows from the unforgeability of the relaxed Ring-GPV scheme, while the security against extraction follows from the security of Ring-LWE encryption.

Other Applications. One of the most prominent applications of verifiable encryption is in group signatures, where group members can sign anonymously in name of the entire group, but their anonymity can be lifted by a dedicated opening authority. A common construction paradigm is to let a user's signing key consist of a signature by the group manager on the user's identity. To sign a message, the user encrypts their identity under the public key of the opener and creates a NIZK proof of knowledge of a valid signature for the encrypted identity. To recover the identity of the signer, the opener simply decrypts the ciphertext included in the signature.

Embodiments of the verifiable encryption scheme may be very useful to group signatures in principle, what is missing is a practical signature scheme where the message m

TABLE 1

Sample Parameter Sets for the Verifiable Encryption Scheme

|  | I | II | III |
|---|---|---|---|
| n | 1024 | 2048 | 2048 |
| k | 1 | 2 | 2 |
| p | 13 | $2^{15}$ | $2^{30}$ |
| $\|m\|_\infty$ | 1 | 1 | $2^{18}$ |
| σ | 25344 | 50688 | $\approx 2^{23.6}$ |
| q | $\approx 2^{34}$ | $\approx 2^{47}$ | $\approx 2^{70}$ |
| gamma factor | ≈1.0046 | ≈1.0033 | ≈1.0052 |
| proof size | 9 KB | 38 KB | 54 KB |
| ciphertext size | 9 KB | 48 KB | 71 KB | and the signature s are short vectors for which the verification equation can be expressed as a linear relation $$B \begin{bmatrix} m \\ s \end{bmatrix} = u.$$

Concrete Parameters. Some examples of proofs of plaintext knowledge and verifiable encryption schemes are shown in Table 1. The security of the scheme may be expressed in terms of a "gamma factor". For example, values of 1.01 may be broken today, 1.007 seem to be fairly secure (conjectured at least 80-bits), and those less than 1.005 are believed to require more than $2^{128}$ time even for quantum computers.

For a proof of plaintext knowledge instantiated with the parameters in column I. The exact parameters for verifiable encryption will of course depend on the parameters of the relation in (9). In columns II and III, the parameters that are large enough to instantiate the two exemplary applications described above are shown. All the parameters are as defined in the process shown in FIG. 3, with the value of q taken so as to satisfy (14) in the statement of Lemma 3 which is required for the decryption algorithm to function correctly.

Figure 6:
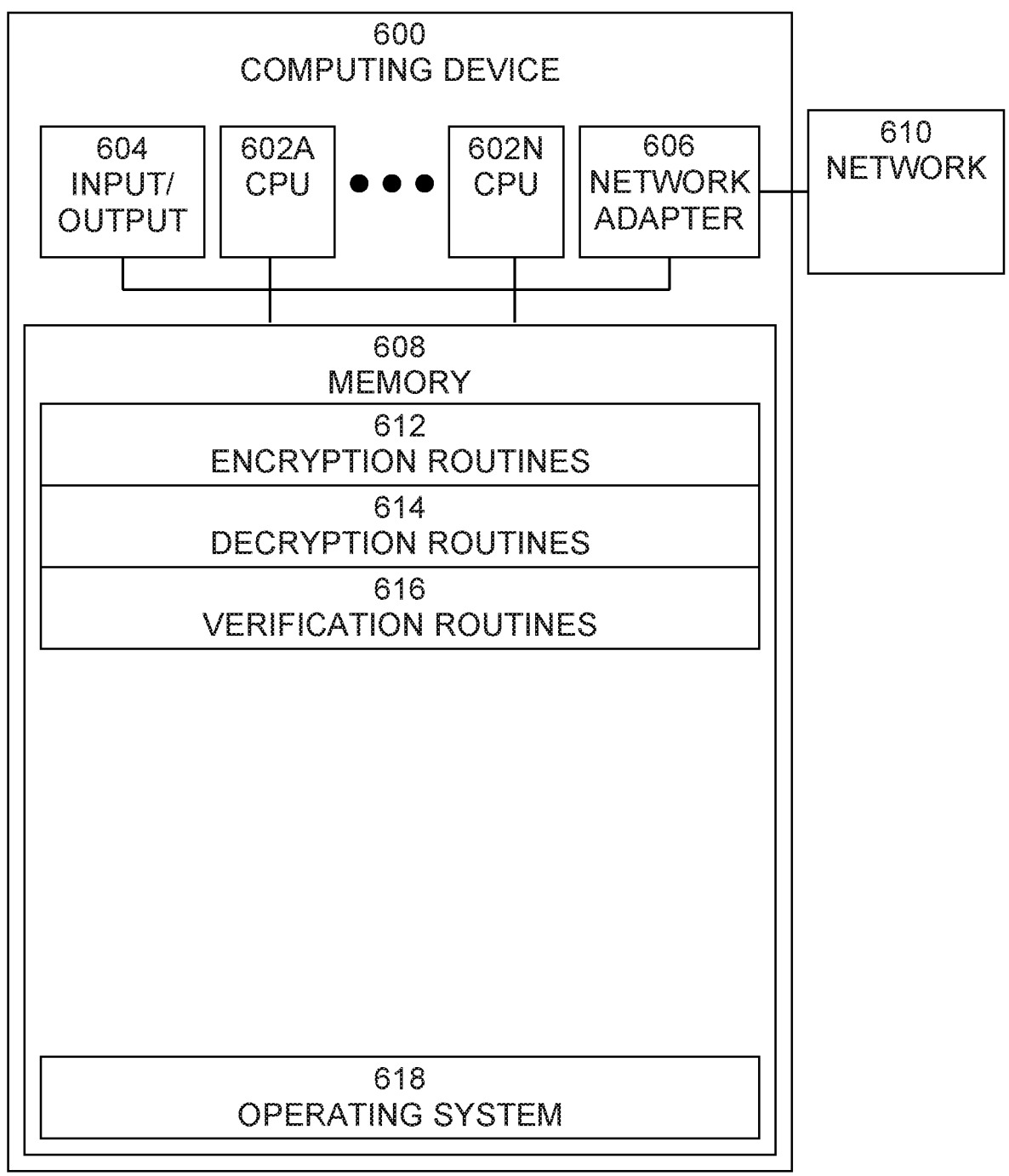
FIG. 6 is an exemplary block diagram of a computer system in which processes involved in the embodiments described herein may be implemented.

An exemplary block diagram of a computer system 600, in which processes involved in the embodiments described herein may be implemented, is shown in FIG. 6. Computer system 600 is typically a programmed general-purpose computer system, such as an embedded processor, system on a chip, personal computer, workstation, server system, minicomputer, or mainframe computer. Computer system 600 may include one or more processors (CPUs) 602A-602N, input/output circuitry 604, network adapter 606, and memory 608. CPUs 602A-602N execute program instructions in order to carry out the functions of the present invention. Typically, CPUs 602A-602N are one or more microprocessors, such as an INTEL PENTIUM processor. FIG. 6 illustrates an embodiment in which computer system 600 is implemented as a single multi-processor computer system, in which multiple processors 602A-602N share system resources, such as memory 608, input/output circuitry 604, and network adapter 606. However, the present invention also contemplates embodiments in which computer system 600 is implemented as a plurality of networked computer systems, which may be single-processor computer systems, multi-processor computer systems, or a mix thereof.

Input/output circuitry 604 provides the capability to input data to, or output data from, computer system 600. For example, input/output circuitry may include input devices, such as keyboards, mice, touchpads, trackballs, scanners, etc., output devices, such as video adapters, monitors, printers, etc., and input/output devices, such as, modems, etc. Network adapter 606 interfaces device 600 with a network 610. Network 610 may be any public or proprietary LAN or WAN, including, but not limited to the Internet.

Memory 608 stores program instructions that are executed by, and data that are used and processed by, CPU 602 to perform the functions of computer system 600. Memory 608 may include, for example, electronic memory devices, such as random-access memory (RAM), read-only memory (ROM), programmable read-only memory (PROM), electrically erasable programmable read-only memory (EEPROM), flash memory, etc., and electro-mechanical memory, such as magnetic disk drives, tape drives, optical disk drives, etc., which may use an integrated drive electronics (IDE) interface, or a variation or enhancement thereof, such as enhanced IDE (EIDE) or ultra-direct memory access (UDMA), or a small computer system interface (SCSI) based interface, or a variation or enhancement thereof, such as fast-SCSI, wide-SCSI, fast and wide-SCSI, etc., or Serial Advanced Technology Attachment (SATA), or a variation or enhancement thereof, or a fiber channel-arbitrated loop (FC-AL) interface.

The contents of memory 608 may vary depending upon the function that computer system 600 is programmed to perform. One of skill in the art would recognize that software routines implementing such functions, along with the memory contents related to those routines, may be included on one system or device, or may be distributed among a plurality of systems or devices, based on well-known engineering considerations. The present invention contemplates any and all such arrangements.

In the example shown in FIG. 6, memory 608 may include encryption routines 612, decryption routines 614, verification routines 616, and operating system 618. For example, encryption routines 612 may include routines to receive and encrypt input data or plain-text, according to techniques described above. Decryption routines 614 may include routines to receive and decrypt input data or ciphertext, according to techniques described above. Verification routines 616 may include routines to perform verification processing, such as processing proof of plaintext knowledge, according to techniques described above. Operating system 628 provides overall system functionality.

As shown in FIG. 6, the present invention contemplates implementation on a system or systems that provide multi-processor, multi-tasking, multi-process, and/or multi-thread computing, as well as implementation on systems that provide only single processor, single thread computing. Multi-processor computing involves performing computing using more than one processor. Multi-tasking computing involves performing computing using more than one operating system task. A task is an operating system concept that refers to the combination of a program being executed and bookkeeping information used by the operating system. Whenever a program is executed, the operating system creates a new task for it. The task is like an envelope for the program in that it identifies the program with a task number and attaches other bookkeeping information to it. Many operating systems, including Linux, UNIX, OS/2, and Windows, are capable of running many tasks at the same time and are called multitasking operating systems. Multi-tasking is the ability of an operating system to execute more than one executable at the same time. Each executable is running in its own address space, meaning that the executables have no way to share any of their memory. This has advantages, because it is impossible for any program to damage the execution of any of the other programs running on the system. However, the programs have no way to exchange any information except through the operating system (or by reading files stored on the file system). Multi-process computing is similar to multi-tasking computing, as the terms task and process are often used interchangeably, although some operating systems make a distinction between the two.

The present invention may be a system, a method, and/or a computer program product at any possible technical detail level of integration. The computer program product may include a computer readable storage medium (or media) having computer readable program instructions thereon for causing a processor to carry out aspects of the present invention. The computer readable storage medium can be a tangible device that can retain and store instructions for use by an instruction execution device.

The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a ware.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the C programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although specific embodiments of the present invention have been described, it will be understood by those of skill in the art that there are other embodiments that are equivalent, to the described embodiments. Accordingly, it is to be understood that the invention is not to be limited by the specific illustrated embodiments, but only by the scope of the appended claims.

What is claimed is:

1. A computer-implemented method of verifiable encryption comprising:

generating a ciphertext, derived from a plaintext, via an encryption scheme using a computer to execute program instructions stored on a non-transitory computer readable storage medium;

proving validity of the ciphertext using the computer, wherein the proof includes at least one challenge value; and using a decryption procedure that recovers the plaintext by using the computer to choose at least one additional challenge value at random from a challenge space C;

wherein the encryption scheme is a Ring-LWE encryption scheme that generates an output (v, w), where $v \leftarrow p(ar+e)$ and $w \leftarrow p(tr+e')+m$, where e and e' are error terms, m is a message term, r is a randomness term, p is a public parameter that is a positive integer greater than 2, and a and t are public keys, $R_q$ is a ring of polynomials equal to $Z_q[x]/(x^n+1)$ with n a power of 2 and q a prime, $s_1$ and $s_2$ are secret keys defined such that $s_1$, $$s_2 \xleftarrow{\$} S_1,$$

where $S_1$ is a set of polynomials in $R_q$ with coefficients that are zero or one, and the public keys a and t are defined such that $$a \xleftarrow{\$} R_q \text{ and } t \leftarrow as_1 + s_2;$$

wherein the decryption scheme comprises:

selecting a challenge c' at random from the challenge space $C \subseteq S_1$, the challenge space C is stored on the non-transitory computer readable storage medium, the challenge space C including at least one challenge c' which proves the ciphertext is valid;
generating, using the computer, a new challenge $\bar{c}=c-c'$, wherein c is a challenge value in the ciphertext proof, determining whether $$\bar{c}\begin{bmatrix} v \\ w \end{bmatrix} \bmod q$$

is a valid ciphertext;
if $$\bar{c}\begin{bmatrix} v \\ w \end{bmatrix} \bmod q$$

is a valid ciphertext, then decrypting the ciphertext, otherwise, repeatedly selecting a new challenge c' stored on the non-transitory computer readable storage medium until one of the challenge values satisfies the ciphertext proof;
computing $m'=(w-vs_1)(c-c') \bmod q$ using the computer;
checking that c and c' prove the validity of the ciphertext by checking a bound on the norm of m' using the computer; and
if c and c' prove the validity of the ciphertext, outputting $m=m' \bmod p$ from the computer as part of the decrypted plaintext.

2. A computer program product for verifying encryption, the computer program product comprising a non-transitory computer readable storage having program instructions embodied therewith, the program instructions executable by a computer, to cause the computer to perform a method comprising:
generating a ciphertext, derived from a plaintext, via an encryption scheme;
proving validity of the ciphertext, wherein the proof includes at least one challenge value; and
using a decryption procedure that recovers a plaintext by choosing at least one additional challenge value at random from a challenge space C;
wherein the encryption scheme is a Ring-LWE encryption scheme that generates an output (v, w), where $v \leftarrow p(ar+e)$ and $w \leftarrow p(tr+e')+m$, where e and e' are error terms, m is a message term, r is a randomness term, p is a public parameter that is a positive integer greater than 2, and a and t are public keys, $R_q$ is a ring of polynomials equal to $Z_q[x]/(x^n+1)$ with n a power of 2 and q a prime, $s_1$ and $s_2$ are secret keys defined such that $s_1$, $$s_2 \xleftarrow{\$} S_1,$$

where $S_1$ is a set of polynomials in $R_q$ with coefficients that are zero or one, and the public keys a and t are defined such that $$a \xleftarrow{\$} R_q \text{ and } t \leftarrow as_1 + s_2;$$

wherein the decryption scheme comprises:
selecting a challenge c' at random from the challenge space $C \subseteq S_1$, the challenge space C is stored on the non-transitory computer readable storage medium, the challenge space C including at least one challenge c' which proves the ciphertext is valid;
generating, using the computer, a new challenge $\bar{c}=c-c'$, wherein c is a challenge value in the ciphertext proof, determining whether $$\bar{c}\begin{bmatrix} v \\ w \end{bmatrix} \bmod q$$

is a valid ciphertext;
if $$\bar{c}\begin{bmatrix} v \\ w \end{bmatrix} \bmod q$$

is a valid ciphertext, then decrypting the ciphertext, otherwise, repeatedly selecting a new challenge c' stored on the non-transitory computer readable storage medium until one of the challenge values satisfies the ciphertext proof;
computing $m'=(w-vs_1)(c-c')\bmod q$ using the computer;
checking that c and c' prove the validity of the ciphertext by checking a bound on the norm of m' using the computer; and
if c and c' prove the validity of the ciphertext, outputting $m=m' \bmod p$ from the computer as part of the decrypted plaintext.

3. A system for verifying encryption, the system comprising a processor, memory accessible by the processor, and computer program instructions stored in the memory and executable by the processor to cause the processor to perform:
generating a ciphertext, derived from a plaintext, via an encryption scheme;
proving validity of the ciphertext, wherein the proof includes at least one challenge value; and
using a decryption procedure that recovers a plaintext by choosing at least one additional challenge value at random from a challenge space C;
wherein the encryption scheme is a Ring-LWE encryption scheme that generates an output (v, w), where $v \leftarrow p(ar+e)$ and $w \leftarrow p(tr+e')+m$, where e and e' are error terms, m is a message term, r is a randomness term, p is a public parameter that is a positive integer greater than 2, and a and t are public keys, $R_q$ is a ring of polynomials equal to $Z_q[x]/(x^n+1)$ with n a power of 2 and q a prime, $s_1$ and $s_2$ are secret keys defined such that $s_1$, $$s_2 \xleftarrow{\$} S_1,$$

where $S_1$ is a set of polynomials in $R_q$ with coefficients that are zero or one, and the public keys a and t are defined such that $$a \xleftarrow{\$} R_q \text{ and } t \leftarrow as_1 + s_2;$$

wherein the decryption procedure comprises:
  selecting a challenge c' at random from the challenge space $C \subseteq S_1$, the challenge space C is stored on the non-transitory computer readable storage medium, the challenge space C including at least one challenge c' which proves the ciphertext is valid;
  generating, using the computer, a new challenge $\bar{c}=c-c'$, wherein c is a challenge value in the ciphertext proof, determining whether $$\bar{c} \begin{bmatrix} v \\ w \end{bmatrix} \bmod q$$

is a valid ciphertext;

if $$\bar{c} \begin{bmatrix} v \\ w \end{bmatrix} \bmod q$$

is a valid ciphertext, then decrypting the ciphertext, otherwise, repeatedly selecting a new challenge c' stored on the non-transitory computer readable storage medium until one of the challenge values satisfies the ciphertext proof;
  computing $m'=(w-vs_1)(c-c') \bmod q$ using the computer;
  checking that c and c' prove the validity of the ciphertext by checking a bound on the norm of m' using the computer; and
  if c and c' prove the validity of the ciphertext, outputting $m=m' \bmod p$ from the computer as part of the decrypted plaintext.

\* \* \* \* \*